(12) United States Patent
Norige et al.

(10) Patent No.: US 9,864,728 B2
(45) Date of Patent: Jan. 9, 2018

(54) AUTOMATIC GENERATION OF PHYSICALLY AWARE AGGREGATION/DISTRIBUTION NETWORKS

(71) Applicant: NetSpeed Systems, San Jose, CA (US)

(72) Inventors: Eric Norige, San Jose, CA (US); Sailesh Kumar, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 382 days.

(21) Appl. No.: 14/726,289

(22) Filed: May 29, 2015

(65) Prior Publication Data

US 2017/0060809 A1    Mar. 2, 2017

(51) Int. Cl.
G06F 15/17     (2006.01)
G06F 15/78     (2006.01)
H04L 12/933    (2013.01)

(52) U.S. Cl.
CPC ........ G06F 15/7825 (2013.01); H04L 49/109 (2013.01)

(58) Field of Classification Search
CPC ............................ G06F 15/7825; H04L 49/109
See application file for complete search history.

(56) References Cited

U.S. PATENT DOCUMENTS 4,409,838 A    10/1983  Schomberg
4,799,147 A *   1/1989  Heslin ................. G06F 9/264
                                                    712/211
4,933,933 A     6/1990  Dally et al.
(Continued)

FOREIGN PATENT DOCUMENTS

CN     103684961 A    3/2014
JP       5936793      6/2016
(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Naum B Levin
(74) *Attorney, Agent, or Firm* — Procopio, Cory, Hargreaves & Savitch LLP

(57) ABSTRACT

Aspects of the present disclosure provide systems and methods for automatic generation of physically aware aggregation/distribution networks that enable optimized arrangement of a plurality of hardware elements, and provide positions and connectivity for one or more intermediate hardware elements. One or more intermediate hardware elements can be configured to aggregate signals/commands/messages/data from their corresponding hardware elements or from other intermediate hardware elements, and send the aggregated signals/commands/messages/data to a root hardware element that acts as a communication interface for the network. The intermediate hardware elements can also be configured to segregate/distribute signals/commands/message received from the root hardware element to a plurality of specified hardware elements and/or intermediate hardware elements.

18 Claims, 18 Drawing Sheets

(56) References Cited

U.S. PATENT DOCUMENTS

| | | | | |
|---|---|---|---|---|
| 5,105,424 | A | 4/1992 | Flaig et al. | |
| 5,163,016 | A | 11/1992 | Har'El et al. | |
| 5,355,455 | A | 10/1994 | Hilgendorf et al. | |
| 5,432,785 | A | 7/1995 | Ahmed et al. | |
| 5,563,003 | A | 10/1996 | Suzuki et al. | |
| 5,583,990 | A | 12/1996 | Birrittella et al. | |
| 5,588,152 | A | 12/1996 | Dapp et al. | |
| 5,764,740 | A | 6/1998 | Holender | |
| 5,764,741 | A | 6/1998 | Holender | |
| 5,859,981 | A | 1/1999 | Levin et al. | |
| 5,991,308 | A | 11/1999 | Fuhrmann et al. | |
| 6,003,029 | A | 12/1999 | Agrawal et al. | |
| 6,029,220 | A | 2/2000 | Iwamura et al. | |
| 6,058,385 | A | 5/2000 | Koza et al. | |
| 6,101,181 | A | 8/2000 | Passint et al. | |
| 6,108,739 | A | 8/2000 | James et al. | |
| 6,249,902 | B1 | 6/2001 | Igusa et al. | |
| 6,314,487 | B1 | 11/2001 | Hahn et al. | |
| 6,377,543 | B1 | 4/2002 | Grover | |
| 6,415,282 | B1 | 7/2002 | Mukherjea et al. | |
| 6,526,451 | B2* | 2/2003 | Kasper | G06F 5/065 370/359 |
| 6,674,720 | B1 | 1/2004 | Passint et al. | |
| 6,711,717 | B2 | 3/2004 | Nystrom et al. | |
| 6,925,627 | B1 | 8/2005 | Longway et al. | |
| 6,967,926 | B1 | 11/2005 | Williams, Jr. et al. | |
| 6,983,461 | B2 | 1/2006 | Hutchison et al. | |
| 7,007,095 | B2* | 2/2006 | Chen | H04L 47/10 709/230 |
| 7,046,633 | B2 | 5/2006 | Carvey | |
| 7,065,730 | B2 | 6/2006 | Alpert et al. | |
| 7,127,508 | B2* | 10/2006 | Edmison | H04L 1/20 709/224 |
| 7,143,221 | B2 | 11/2006 | Bruce et al. | |
| 7,318,214 | B1 | 1/2008 | Prasad et al. | |
| 7,379,424 | B1 | 5/2008 | Krueger | |
| 7,424,698 | B2* | 9/2008 | Honary | G06F 17/5045 716/103 |
| 7,437,518 | B2 | 10/2008 | Tsien | |
| 7,461,236 | B1 | 12/2008 | Wentzlaff | |
| 7,509,619 | B1 | 3/2009 | Miller et al. | |
| 7,564,865 | B2 | 7/2009 | Radulescu | |
| 7,583,602 | B2 | 9/2009 | Bejerano | |
| 7,590,959 | B2 | 9/2009 | Tanaka | |
| 7,598,766 | B2* | 10/2009 | Mercaldi-Kim | H03K 19/177 326/28 |
| 7,626,983 | B2* | 12/2009 | Rhee | G06F 17/5068 370/386 |
| 7,636,781 | B2* | 12/2009 | Li | H04L 45/04 370/229 |
| 7,693,064 | B2 | 4/2010 | Thubert et al. | |
| 7,701,252 | B1 | 4/2010 | Chow et al. | |
| 7,724,735 | B2 | 5/2010 | Locatelli et al. | |
| 7,725,859 | B1 | 5/2010 | Lenahan et al. | |
| 7,774,783 | B2 | 8/2010 | Toader | |
| 7,808,968 | B1 | 10/2010 | Kalmanek, Jr. et al. | |
| 7,853,774 | B1 | 12/2010 | Wentzlaff | |
| 7,917,885 | B2 | 3/2011 | Becker | |
| 7,957,381 | B2* | 6/2011 | Clermidy | H04L 12/56 370/351 |
| 7,973,804 | B2 | 7/2011 | Mejdrich et al. | |
| 8,018,249 | B2* | 9/2011 | Koch | G06F 15/7867 326/38 |
| 8,020,163 | B2 | 9/2011 | Nollet et al. | |
| 8,020,168 | B2 | 9/2011 | Hoover et al. | |
| 8,042,087 | B2* | 10/2011 | Murali | G06F 17/5045 370/235 |
| 8,050,256 | B1 | 11/2011 | Bao et al. | |
| 8,059,551 | B2 | 11/2011 | Milliken | |
| 8,099,757 | B2 | 1/2012 | Riedl et al. | |
| 8,136,071 | B2 | 3/2012 | Solomon | |
| 8,203,938 | B2 | 6/2012 | Gibbings | |
| 8,261,025 | B2 | 9/2012 | Mejdrich et al. | |
| 8,270,316 | B1* | 9/2012 | Chang | G06F 15/7825 370/254 |
| 8,281,297 | B2 | 10/2012 | Dasu et al. | |
| 8,306,042 | B1 | 11/2012 | Abts | |
| 8,312,402 | B1 | 11/2012 | Okhmatovski et al. | |
| 8,327,031 | B2* | 12/2012 | Lavigne | H04L 49/65 709/250 |
| 8,352,774 | B2 | 1/2013 | Elrabaa | |
| 8,407,425 | B2 | 3/2013 | Gueron et al. | |
| 8,412,795 | B2 | 4/2013 | Mangano et al. | |
| 8,438,578 | B2 | 5/2013 | Hoover et al. | |
| 8,448,102 | B2 | 5/2013 | Kornachuk et al. | |
| 8,490,110 | B2 | 7/2013 | Hoover et al. | |
| 8,492,886 | B2 | 7/2013 | Or-Bach et al. | |
| 8,514,889 | B2 | 8/2013 | Jayasimha et al. | |
| 8,531,943 | B2* | 9/2013 | Olofsson | G06F 15/17381 370/229 |
| 8,541,819 | B1 | 9/2013 | Or-Bach et al. | |
| 8,543,964 | B2 | 9/2013 | Ge et al. | |
| 8,601,423 | B1* | 12/2013 | Philip | G06F 17/5072 703/15 |
| 8,619,622 | B2 | 12/2013 | Harrand et al. | |
| 8,635,577 | B2 | 1/2014 | Kazda et al. | |
| 8,661,455 | B2 | 2/2014 | Mejdrich et al. | |
| 8,667,439 | B1 | 3/2014 | Kumar et al. | |
| 8,705,368 | B1 | 4/2014 | Abts et al. | |
| 8,711,867 | B2 | 4/2014 | Guo et al. | |
| 8,717,875 | B2 | 5/2014 | Bejerano et al. | |
| 8,726,295 | B2 | 5/2014 | Hoover et al. | |
| 8,738,860 | B1 | 5/2014 | Griffin et al. | |
| 8,793,644 | B2 | 7/2014 | Michel et al. | |
| 8,798,038 | B2 | 8/2014 | Jayasimha et al. | |
| 8,819,611 | B2 | 8/2014 | Philip et al. | |
| 8,819,616 | B2* | 8/2014 | Philip | G06F 17/5072 340/2.29 |
| 8,867,559 | B2* | 10/2014 | Dai | H04L 47/6275 370/414 |
| 8,934,377 | B2* | 1/2015 | Kumar | H04L 47/2425 370/254 |
| 9,054,977 | B2* | 6/2015 | Kumar | H04L 41/12 |
| 9,130,856 | B2* | 9/2015 | Kumar | H04L 47/125 |
| 9,160,627 | B2* | 10/2015 | Kumar | H04L 49/109 |
| 9,210,048 | B1 | 12/2015 | Marr | |
| 9,225,545 | B2* | 12/2015 | Archer | H04L 12/413 |
| 9,251,116 | B2* | 2/2016 | Muff | G06F 15/7825 |
| 9,344,358 | B2* | 5/2016 | Bhardwaj | H04L 45/021 |
| 9,473,388 | B2* | 10/2016 | Kumar | H04L 45/16 |
| 9,479,456 | B2* | 10/2016 | Hutton | H04L 49/109 |
| 9,529,775 | B2* | 12/2016 | Lih | H04L 12/437 |
| 9,548,945 | B2* | 1/2017 | Tran | H04L 49/254 |
| 9,571,341 | B1 | 2/2017 | Kumar et al. | |
| 9,590,813 | B1* | 3/2017 | Kumar | H04L 45/16 |
| 9,720,867 | B2* | 8/2017 | Dobbs | G06F 13/4027 |
| 2002/0071392 | A1 | 6/2002 | Grover et al. | |
| 2002/0073276 | A1 | 6/2002 | Cooke et al. | |
| 2002/0083159 | A1 | 6/2002 | Ward et al. | |
| 2002/0095430 | A1 | 7/2002 | Egilsson et al. | |
| 2003/0088602 | A1 | 5/2003 | Dutta et al. | |
| 2003/0145314 | A1 | 7/2003 | Nguyen et al. | |
| 2004/0049565 | A1 | 3/2004 | Keller et al. | |
| 2004/0103218 | A1 | 5/2004 | Blumrich et al. | |
| 2004/0216072 | A1 | 10/2004 | Alpert et al. | |
| 2005/0147081 | A1 | 7/2005 | Acharya et al. | |
| 2005/0203988 | A1* | 9/2005 | Nollet | G06F 15/7825 709/201 |
| 2006/0002303 | A1 | 1/2006 | Bejerano | |
| 2006/0031615 | A1 | 2/2006 | Bruce et al. | |
| 2006/0075169 | A1 | 4/2006 | Harris et al. | |
| 2006/0161875 | A1 | 7/2006 | Rhee | |
| 2006/0206297 | A1 | 9/2006 | Ishiyama et al. | |
| 2006/0209846 | A1 | 9/2006 | Clermidy et al. | |
| 2006/0268691 | A1* | 11/2006 | Ramanan | H04L 45/123 370/229 |
| 2006/0268909 | A1 | 11/2006 | Langevin et al. | |
| 2007/0038987 | A1 | 2/2007 | Ohara et al. | |
| 2007/0088537 | A1 | 4/2007 | Lertora et al. | |
| 2007/0118320 | A1 | 5/2007 | Luo et al. | |
| 2007/0147379 | A1 | 6/2007 | Lee et al. | |

(56) References Cited

U.S. PATENT DOCUMENTS

| | | |
|---|---|---|
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0245257 A1* | 10/2009 | Comparan .............. H04L 45/00 370/392 |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0154282 A1 | 6/2011 | Chang et al. |
| 2011/0191088 A1* | 8/2011 | Hsu ......................... G06F 17/50 703/13 |
| 2011/0191774 A1* | 8/2011 | Hsu ......................... G06F 17/50 718/100 |
| 2011/0235531 A1 | 9/2011 | Vangal et al. |
| 2011/0276937 A1 | 11/2011 | Waller |
| 2011/0299551 A1* | 12/2011 | Fiorone .................. H04L 45/00 370/401 |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1* | 7/2013 | Lecler .................. G06F 17/5072 716/122 |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1* | 5/2014 | Hutton .................. H04L 49/109 370/360 |
| 2014/0156929 A1* | 6/2014 | Falsafi ................ G06F 12/0813 711/122 |
| 2014/0211622 A1 | 7/2014 | Kumar et al. |
| 2014/0254388 A1 | 9/2014 | Kumar et al. |
| 2015/0043575 A1 | 2/2015 | Kumar et al. |
| 2015/0109024 A1* | 4/2015 | Abdelfattah ..... H03K 19/01758 326/41 |
| 2015/0159330 A1 | 6/2015 | Weisman et al. |
| 2015/0220470 A1* | 8/2015 | Chen .................... H04L 49/109 710/105 |
| 2015/0341224 A1* | 11/2015 | van Ruymbeke ....... H04L 12/56 370/254 |
| 2016/0139900 A1* | 5/2016 | Pudiyapura ............... G06F 8/33 717/149 |
| 2016/0182256 A1* | 6/2016 | Anders ............... G06F 15/7825 370/352 |
| 2017/0041249 A1* | 2/2017 | Hutton .................. H04L 49/109 |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

(56) References Cited

OTHER PUBLICATIONS

Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li B. et al., CoQoS: Coordinating QoS-Aware Shared Resources in NoC-based SoCs, J. Parallel Distib. Comput., 71(5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, et al., "Formal Verification of Circuit-Switched Network on Chip (NoC) Architectures using SPIN", IEEE © 2014, 8 pages.
International Search Report and Written Opinion for PCT/US2014/023625, dated Jul. 10, 2014, 9 pgs.
International Search Report and Written Opinion for PCT/US2014/012012, dated May 14, 2014, 10 pgs.
International Search Report and Written Opinion for PCT/US2014/037902, dated Sep. 30, 2014, 14 pgs.
International Search Report and Written Opinion for PCT/US2014/048190, dated Nov. 28, 2014, 11 pgs.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Preliminary Report on Patentability for International Application No. PCT/US2013/064140, dated Apr. 23, 2015, 6 pages.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 3 pages, untranslated, Japan Patent Office.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Dec. 5, 2016, 5 pages. KIPO, Korea.
Notice of Grant for Japanese Patent Application No. 2015-535898 dated Jan. 17, 2017, 3 pages, untranslated. Japan Patent Office.
Office Action for Japanese Patent Application No. 2015-535898 dated Oct. 25, 2016, 2 pages English, 2 pages untranslated copy. Japan Patent Office.

\* cited by examiner

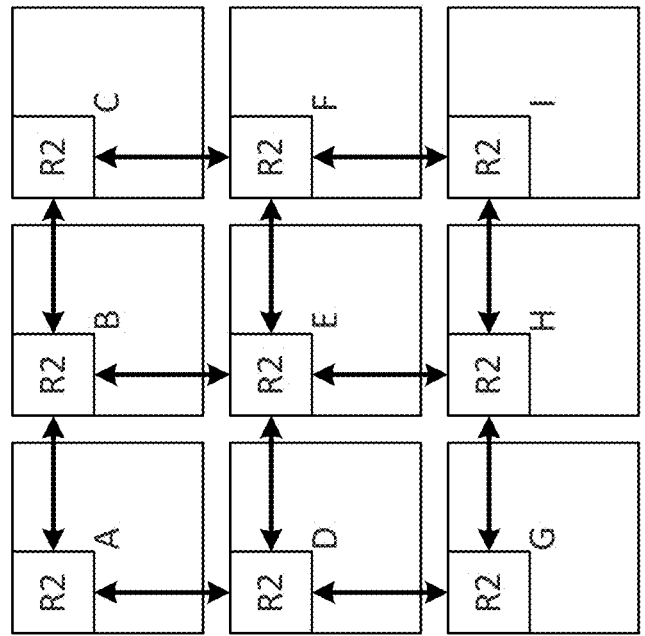
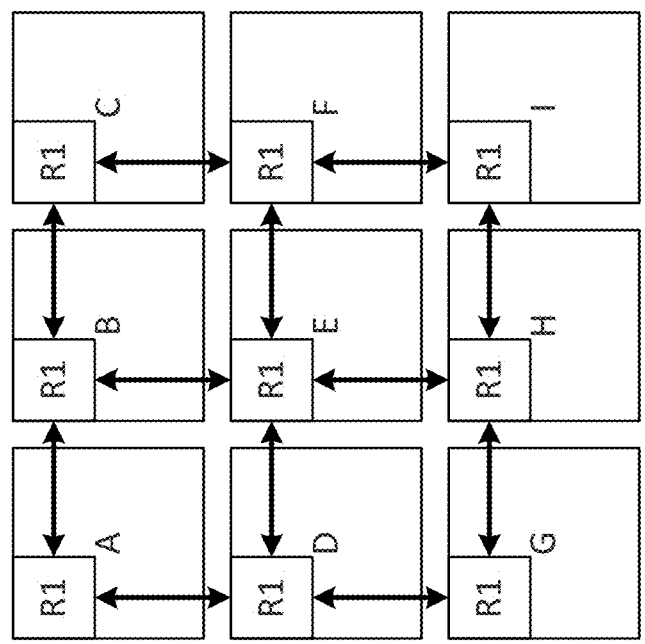
FIG. 3(a)

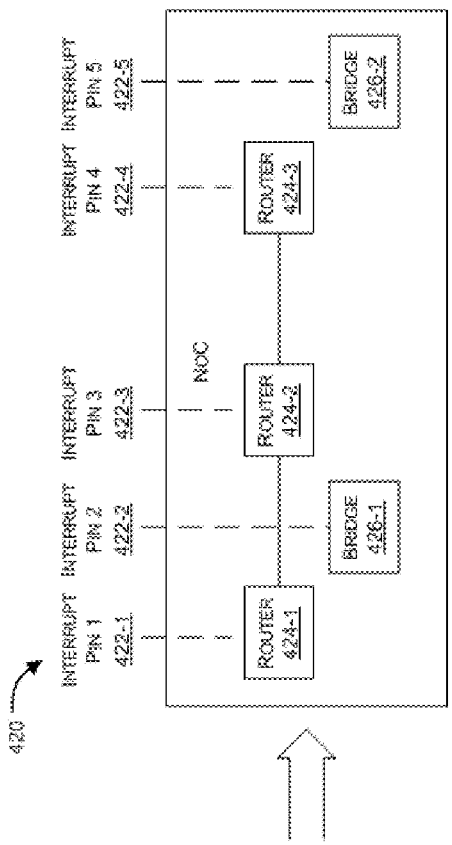
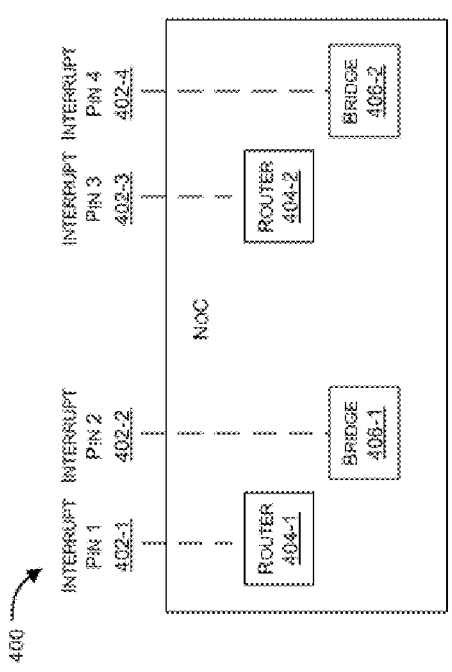
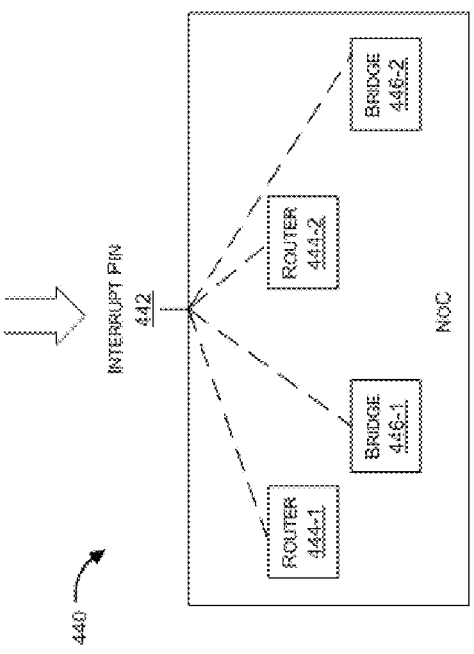

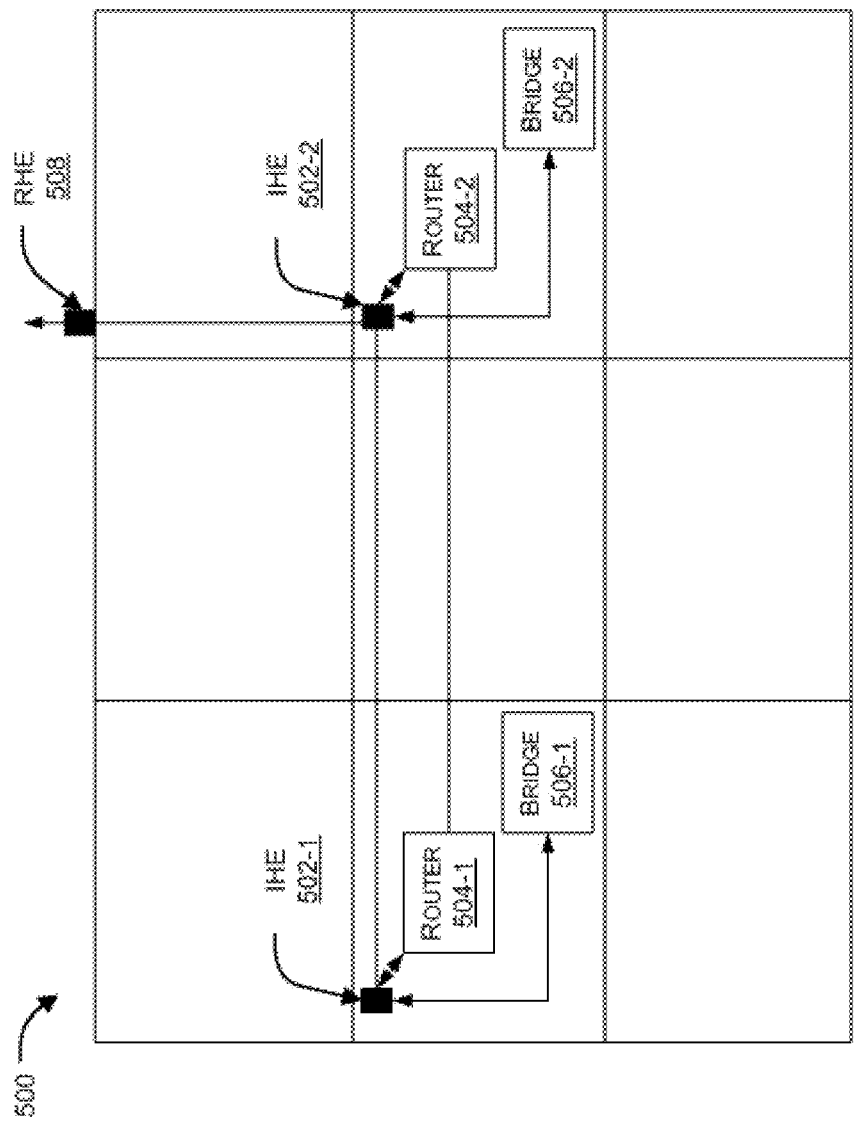

AUTOMATIC GENERATION OF PHYSICALLY AWARE AGGREGATION/DISTRIBUTION NETWORKS

BACKGROUND

Technical Field

Methods and example implementations described herein are directed to interconnect architectures, and more specifically, to automatic generation of physically aware aggregation and/or distribution networks.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

A typical NoC may have hundreds of routers or bridges or other network elements that may require connectivity with other electronic components outside the NoC or with other components within the NoC. Generally routers/bridges/network elements are connected through specific pins that receive/send specific types of signals/messages/commands from/to other network elements within the NoC or outside the NoC. For example, each router, bridge, or any other network element of a NoC may have an interrupt pin that allows interrupt commands to be received and/or sent out from that network element. In different implementations, there may be N number of pins connected to each router/network element, wherein each pin may be configured to receive a particular type of signals/commands/message, such as interrupt signals, power signals, and reset commands. Providing physical connectivity between these many pins for hundreds of network elements may not be desirable as it may complicate the NoC design. Even if such a NoC is designed, it may not be scalable if an additional router/bridge/network element is to be added in the NoC later in future.

To simply the complexity in NoC connectivity, a superset pin, for example a superset interrupt PIN, can be provided, which can be directly connected to each router/network element/hardware element of the NoC and can receive/send signals/commands (e.g. interrupt signal) on behalf of any router/network elements of the NoC. When a command/signal is required to be sent to any network element, that command/signal can be sent to the superset pin, which forwards the command/signal to the targeted network element. In such an implementation, commands/signals may be aggregated or distributed through the single point/pin, however such an implementation may choke or overburden the superset pin and there may be a time delay in communication at the superset pin. The location/placement of the superset pin and other hardware elements in a network design can be important to provide an optimized network.

Though the above illustration relates to a NoC network, similar problems exist with other types of networks as well, where hardware components/elements need to be connected with each other. The correct placement of hardware elements and intermediate hardware elements that provides connectivity between hardware elements can be important for an optimal performance of the network.

SUMMARY

Therefore, there is a need for a method and system for automatic generation of physically aware aggregation/distribution network that can provide a simplified and efficient implementation of NoC connectivity.

Aspects of the present disclosure are directed to methods and systems for automatic generation of physically aware aggregation/distribution networks. Aspects of the present disclosure provide a method for automatic generation of physically aware aggregation/distribution networks that lead to an optimized arrangement of a plurality of hardware elements and provide positions and connectivity of one or more intermediate hardware elements.

The proposed method for automatic generation of aggregation/distribution network can include the steps of receiving an input specification of the desired network, processing the input specification to determine and resolve one or more conflicts, determining an arrangement of a plurality of hardware elements, providing positions of one or more intermediate hardware elements, and generating connectivity between the plurality of hardware elements and the one or more intermediate hardware elements.

According to an example implementation of the present disclosure, the intermediate hardware elements can be configured to aggregate signals/commands/messages/data from the plurality of hardware elements, including but not limited to the plurality of end point hardware elements and other intermediate hardware elements, and then send the aggregated signals/commands/messages/data to a root hardware element. According to another example implementation of the present disclosure, the intermediate hardware elements can be configured to segregate/distribute signals/commands/messages/data received from a root hardware element to the plurality of hardware elements, including but not limited to a plurality of end point hardware elements and/or other intermediate hardware elements. In an example implementation, the root hardware element can be configured to work as an interface between the network in context, other hardware elements, and the outside network(s).

In an example implementation, a plurality of user selected and/or auto-selected hardware elements can be grouped together based on their proximity and/or other parameters, and an intermediate hardware element can be created for the grouped hardware elements such that all communication (e.g. a particular type) originating from any of the plurality of hardware elements are routed through the corresponding intermediate hardware elements.

In example implementations, position and connectivity for one or more intermediate hardware elements can be determined based on one or more input parameters, including but not limited to, minimum/maximum distance of intermediate hardware element from the hardware element, number of desired/specified intermediate hardware elements, restricted/disallowed regions for placement of intermediate hardware elements and routing functions. In an example implementation, an indication of permitted region and/or restricted region can be taken as an input from the user, and position of the intermediate hardware elements can be determined accordingly.

According to an example implementation of the present disclosure, a user defined and/or auto generated routing function can be used to determine connectivity topology between the intermediate hardware elements and the end point hardware elements. In an example implementation, the routing function to be used for determining connectivity topology between the intermediate hardware elements and/or hardware elements can be provided as an input by the user. In another example implementation, the routing function to be used for determining the topology between the intermediate hardware elements and/or hardware elements can be auto-generated based on one or more input specifications of the network.

According to an example implementation of the present disclosure, the arrangement and placement of the plurality of hardware elements can be a NoC topology, wherein the hardware elements are network elements of the NoC, and the position of one or more intermediate hardware elements can be the position of one or more intermediate network elements of the NoC. In an example implementation, the position and connectivity of one or more intermediate network elements of the NoC can be determined based on one or more input parameters, including but not limited to, the restricted/allowed region of intermediate network elements, the number of intermediate network elements, and other input specification of the NoC. In an example implementation, connectivity of the intermediate network elements can be determined based on the permitted position and/or capacity of the NoC channels.

According to an example implementation of the present disclosure, the intermediate hardware elements/intermediate network elements can be configured to aggregate signals from the plurality of hardware elements/network elements, and forward the aggregated signal to a root hardware element by using one or more user defined or auto-selected functions. In an example implementation, an intermediate hardware element can be configured to aggregate interrupt signal(s) from a plurality of hardware elements to form a single output interrupt signal and forward the single output interrupt signal to another intermediate hardware element or to a root hardware element using an interrupt aggregation function. In another example implementation, intermediate hardware element(s) can be configured to receive reset signal(s) such as "reset done", "reset started" and so on, from a plurality of hardware elements to form an aggregated reset signal, and then send the aggregated reset signal to other intermediate hardware elements and/or to the root hardware element. In another example implementation, intermediate hardware elements can be configured to aggregate power management control signals from a plurality of hardware elements into a single output power management control signal, and then forward the single output power management control signal to other intermediate hardware element and/or to a root hardware element.

According to an example implementation of the present disclosure, the intermediate hardware elements/intermediate network elements can be configured to segregate/distribute signals received from a root hardware element and/or from another intermediate hardware element, determine plurality of hardware elements/network elements, and forward the segregated signals to the plurality of hardware elements using one or other user defined and/or auto-selected functions. In an example implementation, an intermediate hardware element can be configured to segregate/distribute any signal such as interrupt signal, reset signal, power control signal, and forward those signals to the destination hardware elements.

In an example implementation, intermediate hardware elements can be configured to distribute signals to a plurality of hardware elements by identifying destination/source of the signals through at least one of a one hot format, or m-Hot encoding format, or binary encoding format. In an example implementation, connectivity between intermediate hardware elements can be represented and/or optimized using a tree structure format, such as a spanning tree format.

According to another example implementation of the present disclosure, the position and connectivity of the plurality of intermediate hardware elements can be determined for hardware elements that are configured to operate in different time domains, for hardware elements that use a different clock frequency, or for hardware elements that are configured to work in different frequency domains.

In an example implementation, the number of intermediate hardware elements for creating an optimized network topology can be determined based on one or more user inputs, including but not limited to, the range/radius restriction of each of the intermediate hardware elements to be used, routing functions, location restrictions, or other input specifications of the network. In another example implementation, the range/radius of each intermediate hardware element can be determined based on one or more user inputs, including but not limited to, the number of intermediate hardware elements to be used, routing functions, location restriction, and other input specifications of the network in context.

In an example implementation, the hardware element and/or the intermediate hardware element can be a router, or a switch, or a bridge or any other network element that forms part of a NoC. In an example implementation, intermediate hardware elements or root hardware elements can be a physical pin or a port that can receive a signal/command from another hardware element and can forward to another hardware element.

Aspects of the present disclosure relate to a computer readable medium for automatic generation of a physically aware aggregation/distribution network that enables an optimized arrangement of plurality of hardware elements and provides positions and connectivity of one or more intermediate hardware elements.

BRIEF DESCRIPTION OF THE DRAWINGS

FIG. 3(a) illustrates an example of a related art two layer NoC interconnect.

FIG. 4(a) illustrates an example NoC having a plurality of interrupt pins, each connected to a particular network element.

FIG. 4(b) illustrates an example NoC having a plurality of network elements, each having a dedicated interrupt pin attached thereto, which can be replaced by a root interrupt pin in accordance with an example implementation of the present disclosure.

FIG. 4(c) illustrates an example NoC having an additional router, and hence requiring an additional pin for receiving/sending interrupt signals.

FIG. 5 illustrates an example network having a plurality of physically aware intermediate hardware elements created in accordance with an example implementation of the present disclosure.

DETAILED DESCRIPTION

Figure 1A:
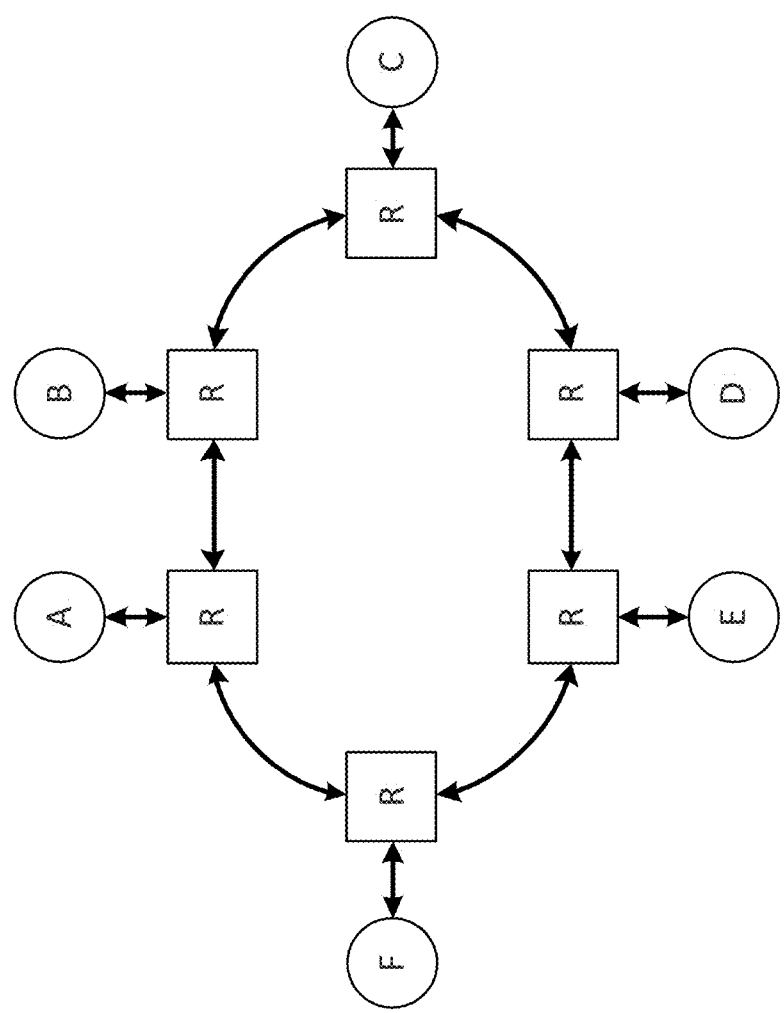
FIGS. 1(a), 1(b) 1(c) and 1(d) illustrate examples of Bidirectional ring, 2D Mesh, 2D Taurus, and 3D Mesh NoC Topologies.
Figure 1B:
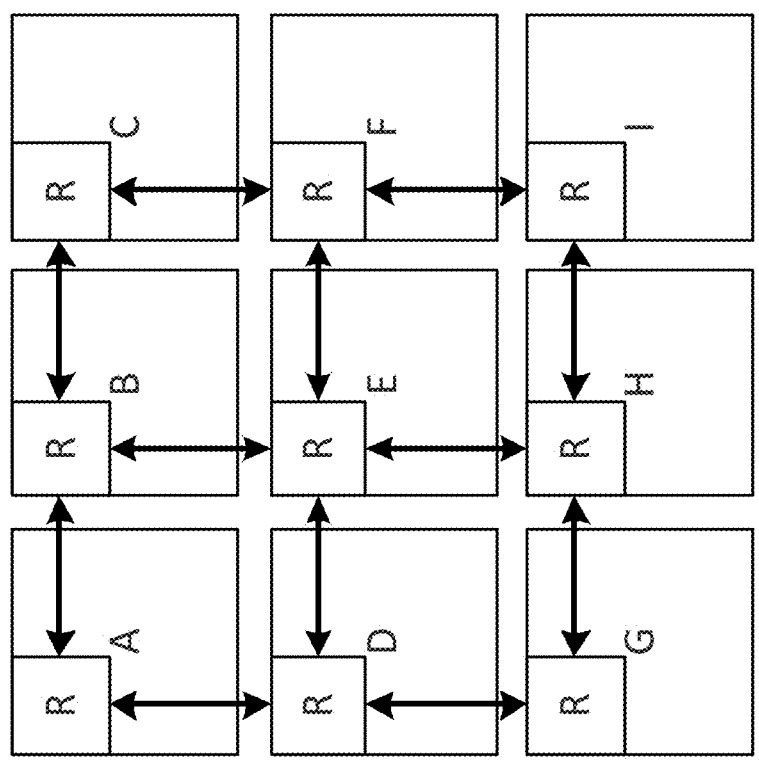
Figure 1C:
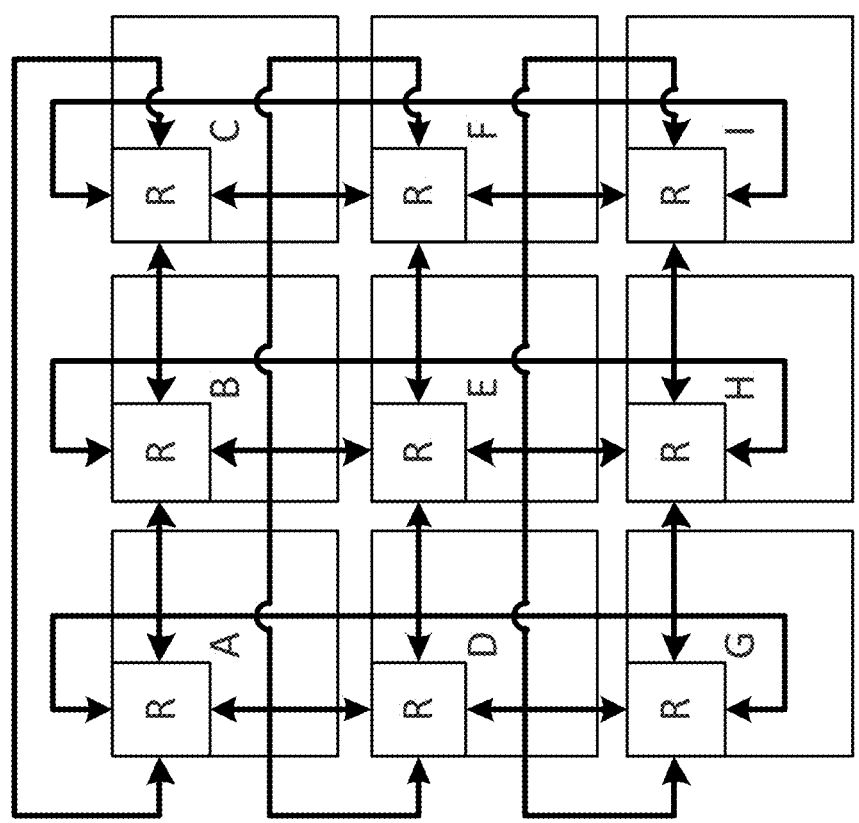
Figure 1D:
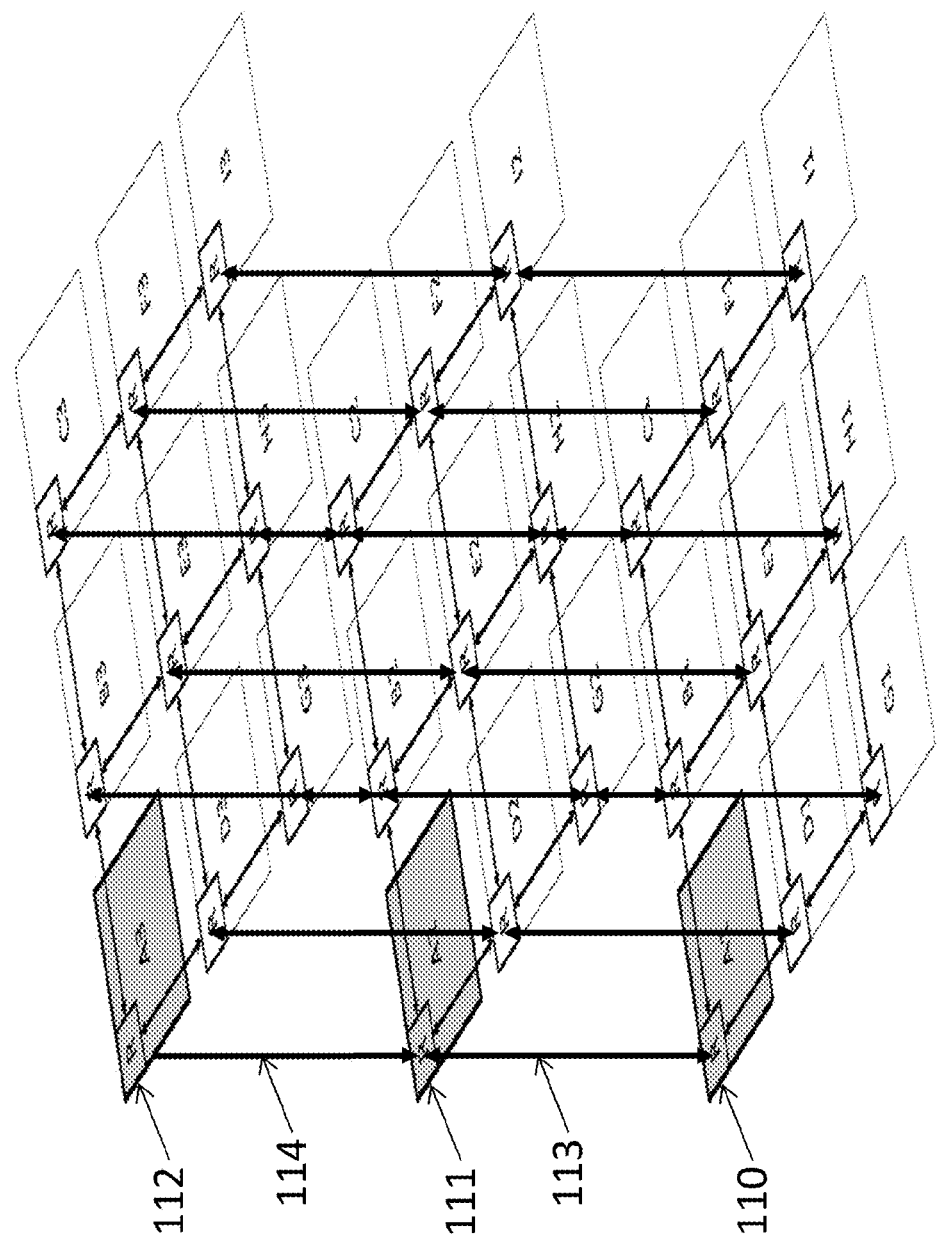
Figure 2A:
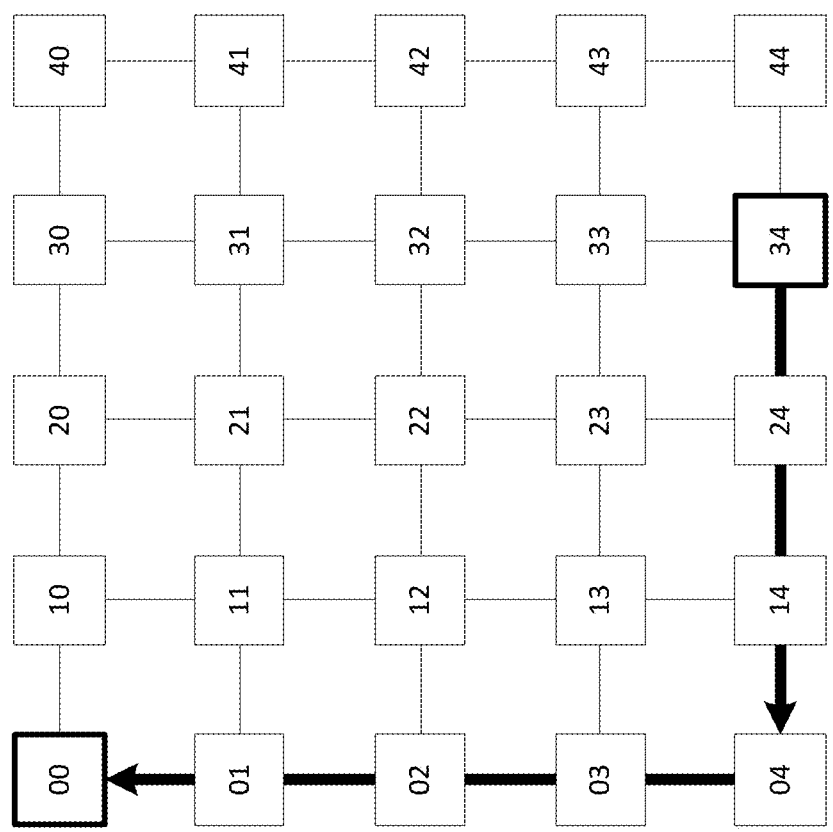
FIG. 2(a) illustrates an example of XY routing in a related art two dimensional mesh.
Figure 2B:
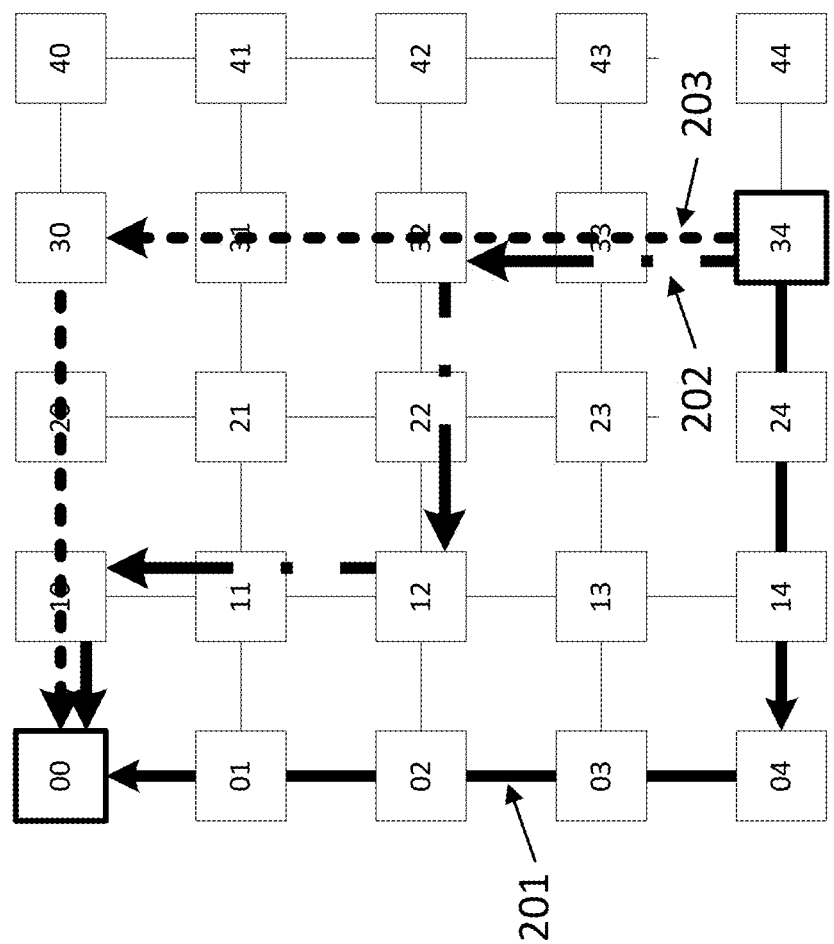
FIG. 2(b) illustrates three different routes between a source and destination nodes.
Figure 3B:
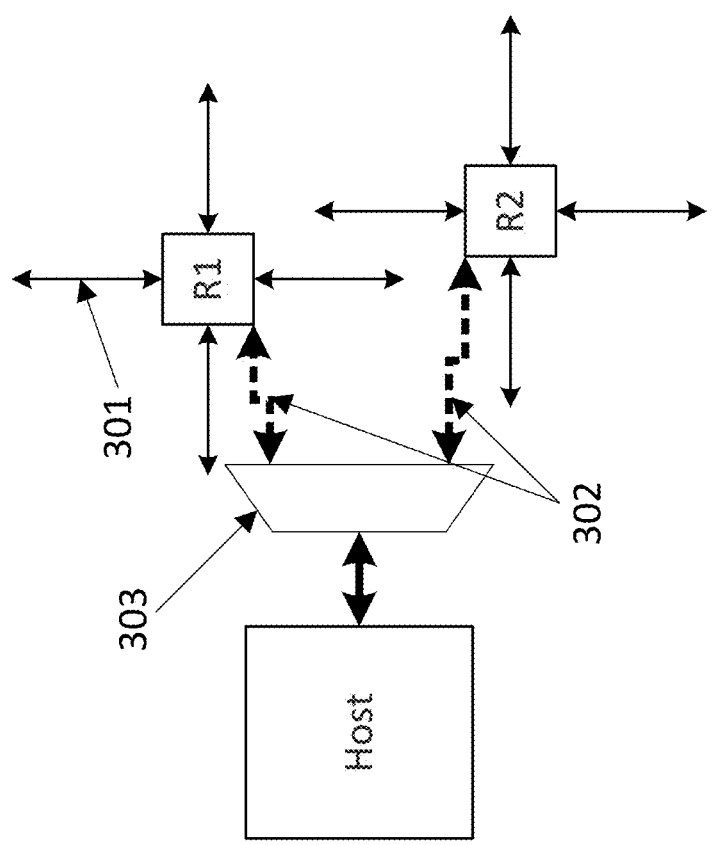
FIG. 3(b) illustrates the related art bridge logic between host and multiple NoC layers.

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

FIG. 4(a) illustrates an example NoC having a plurality of network elements, each having a dedicated interrupt pin attached thereto, which can be replaced by a root interrupt pin in accordance with an example implementation of the present disclosure. As shown in FIG. 4(a), NoC 400 may have several routers such as 404-1 and 404-2, collectively and interchangeably referred to as routers 404 hereinafter, several bridges such as 406-1 and 406-2, collectively and interchangeably referred to as bridges 406 hereinafter, and other network components/elements (not shown here) having dedicated pins. As shown in FIG. 4(a), each router 404-1, bridge 406-2, router 404-2, and bridge 406-2 can be connected to a dedicated interrupt pin such as an interrupt pin 402-1, interrupt pin 402-2, interrupt pin 402-3, and interrupt pin 402-4 respectively. These routers 404, bridges 406, and other network elements may require connectivity to receive and send an interrupt signal from/to corresponding interrupt pins 402 placed at the NoC interface. Having an increasing number of interrupt pins 402 in a NoC may not be desirable as connection/communication channels from interrupt pins 402 to the routers 404 and/or bridges 406 may complicate the circuit. Providing a dedicated interrupt pin for each network component/hardware component can further complicate the circuit when a new network element/hardware element is added in the circuit.

FIG. 4(b) illustrates an example NoC having an additional router and hence requiring an additional pin for receiving/sending interrupt signals. As shown in FIG. 4(b), NoC 420 has a plurality of routers 424 and a plurality of bridges 426, wherein each router 424 and bridge 426 is connected to a corresponding dedicated interrupt pin. For instance, router 424-1 is connected to pin 422-1 and bridge 426-1 is connected to pin 422-2. When compared with FIG. 4(a), a new network element/router 424-2 is added to the NoC, which therefore requires a new interrupt pin 422-3 to be added to enable sending/receiving interrupt signals to/from the new network element/router 422-3, which may further complicate the circuit and in many cases may require redesigning of entire connectivity of the circuit.

An example implementation of the present disclosure can be used to replace the plurality of interrupt pins of FIG. 4(a) and FIG. 4(b) with a superset root pin that can be configured to receive and send interrupt signals on behalf of all the network elements/hardware elements of the circuit. FIG. 4(c) illustrates an example root pin configured to aggregate/distribute interrupt signals from a plurality of network elements/hardware elements in accordance with an example implementation of the present disclosure. In an example implementation, methods and systems of the present disclosure can be used to create a superset interrupt pin that can be configured to receive/send signals (e.g. interrupt signals), on behalf of the plurality of network elements. As shown in FIG. 4(c), a single root interrupt pin 442 of NoC 440 can be configured to provide one to one connectivity to plurality of network elements, such as router 444-1, bridge 446-1, router 444-2 and bridge 446-3. Though the NoC 440 provides a single root interrupt pin 442 for all the network elements, it may not result in an optimized design, as it can require accumulation of lots of connecting wires near interrupt pin 442.

FIG. 5 illustrates an example network 500 having a plurality of physically aware intermediate hardware elements created in accordance with an example implementation of the present disclosure. As shown in FIG. 5, router 504-1 and bridge 506-1 are located nearby and router 504-2 and bridge 506-2 are located nearby. In an example implementation, hardware elements that are placed nearby can be grouped together to form a virtual cell using the method of the present disclosure, and an intermediate hardware element (IHE) can be created for receiving/forwarding commands/signals/data on behalf grouped hardware elements. In an example implementation, the selection of the plurality of hardware elements for forming a group can be done by a user based on proximity of hardware elements and/or other similar parameters. For example, router 504-1 and bridge 506-1, which are located nearby can be grouped together to form a first virtual cell and the router 504-2 and bridge 506-2, which are located nearby can be grouped together to form a second virtual cell. In an example implementation, a plurality of intermediate hardware elements (IHE) 502 such as IHE 502-1, and IHE 502-2 can be strategically located to create a physically aware aggregation and/or segregation/distribution network using the methods of the present disclosure. In an example implementation, a plurality of hardware elements, also referred interchangeably to as network elements hereinafter, can be grouped together to form a cell/group and an intermediate hardware element can be created for each cell/group. A network of physically aware IHEs can be created to provide an optimized network without complicating the network. In an example implementation, position and connectivity of intermediate hardware/network elements such as IHE 502-1 and IHE 502-2 can be determined based the user given input such as number of hardware elements to be grouped together, and/or number of IHE that can be created and/or the number of cells to be created. Such positioning and connectivity of IHEs 502 can also be done automatically. In an example implementation, position and connectivity of IHEs 502 can be determined using user defined routing optimization functions.

In an example implementation, IHE 502-1 can be configured to collect and forward all communications originating/targeting router 504-1 and bridge 506-1, and IHE 502-2 can be configured to collect and forward all the communications originating/targeting router 504-2 and bridge 506-2. Thus, IHE 502-1 and IHE 502-2 can be configured to collect and forward data/signal/commands from any of the hardware elements of the respective cell that associated with the IHEs. In an example implementation, IHE 502-1 and 502-2 can be connected a root hardware element (RHE) 508, which can aggregate/distribute all signals/commands/data from/to the plurality of hardware elements or from/to the plurality of IHEs.

In an example implementation, IHEs such as 502-1 and 502-2 can be configured to aggregate signals/commands/messages from plurality of corresponding hardware elements, including but not limited to, plurality of end point hardware elements and other IHEs, and can send/forward the aggregated signals/commands/messages to a RHE 508. According to another example implementation of the present disclosure, IHEs can be configured to segregate/distribute signals/commands/message received from a RHE 508 to a plurality of hardware elements, including but not limited to, a plurality of end point hardware elements and other IHEs. In an example implementation, RHE 508 can be configured to work as an interface between the network in context, and other hardware elements and outside networks.

In example implementations, position and connectivity for one or more IHEs 502 can be determined based on one or more input parameters, including but not limited to the minimum/maximum distance of IHEs from the hardware elements, the total number of IHEs that a circuit can afford, and other defined set of parameters. In an example implementation, one or more restrictions such as restriction of location/position of IHEs can be provided as an input. In an example implementation, an indication of permitted region and/or restricted region can be taken as an input from the user, and position of intermediate elements can be determined accordingly.

In an example implementation, a user-defined or auto-generated routing function can be used to determine connectivity topology between the IHEs such as 502-1, 502-2, root element 508, and end point hardware elements such as routers 504 and bridges 506. In an example implementation, the routing function to be used for determining connectivity topology between the IHEs 502 and/or the hardware elements can be provided as an input by the user. In another example implementation, the routing function to be used for determining the topology between the IHEs 502 and/or the hardware elements can be auto generated based on one or more input specifications of the network.

In an example implementation, a user can provide the network specification (e.g., a NoC specification) selection of hardware elements that can be grouped together and represented by a single IHE 502, total number of IHEs 502 that a circuit can afford, and total number of hardware elements that be grouped together, among other restrictions/limitations of the network.

In an example implementation, IHEs 502 can be configure to aggregate signals from the plurality of hardware element/network elements included in the IHE group, and forward the aggregated signal to a RHE by using one or other user defined or auto-selected aggregation functions. In an example implementation, IHEs 502 can be configured to aggregate interrupt signal(s) from the plurality of hardware elements to form a single output interrupt signal, and forward the single output interrupt signal to another IHE 502 or to a RHE 508 using an interrupt aggregation function. For example, IHE 502-2 can aggregate signals from router 504-2 and/or bridge 506-2, prepare an aggregated signal, and forward the aggregated signal either to another IHE 502 up in the tree hierarchy or to the root hardware element (RHE) 508 depending on the hierarchical structure/layout of the IHE's 502. According to one example implementation, as would also be shown in subsequent figures, IHE's 502 can be defined in a hierarchical spanning tree format, wherein the leaf IHE's 502 can be connected with one or more hardware/network elements such as 504/506 and the tree can have the RHE 508 on the top to act as a single point interface for the network. In an instance, IHE 502-2 can collect signals from IHE 502-1 and from other hardware elements such as router 504-2 and bridge 506-2 of its cell, create an aggregated signal, and forward the aggregated signal to the RHE 508. One can appreciate that the IHE 502-2 can receive signals, not only from router 504-2 and bridge 506-2 but also from other IHE's 502 depending on the tree structure of the IHE's 502.

In another example implementation, IHEs can be configured to receive reset signals, such as "reset done", "reset started" and so on from a plurality of hardware elements, and then form an aggregated reset signal to send the aggregated reset signal to other IHEs 502 or to the RHE 508. In another example implementation, IHEs 502 can be configured to aggregate power management control signals from a plurality of hardware elements into a single output power management control signal and forward the single output power management control signal to other intermediate hardware element(s) or to a root hardware element 508.

Although FIG. 5 illustrates only four hardware elements (router 504-1, router 504-2, bridge 506-1, and bridge 506-2), and two IHEs (IHE 502-1 and IHE 502-2), in an actual circuit there may be hundreds of hardware elements 504/506, and hence a plurality of IHEs 502 may be required for creating an efficient aggregation/distribution network.

Figure 6A:
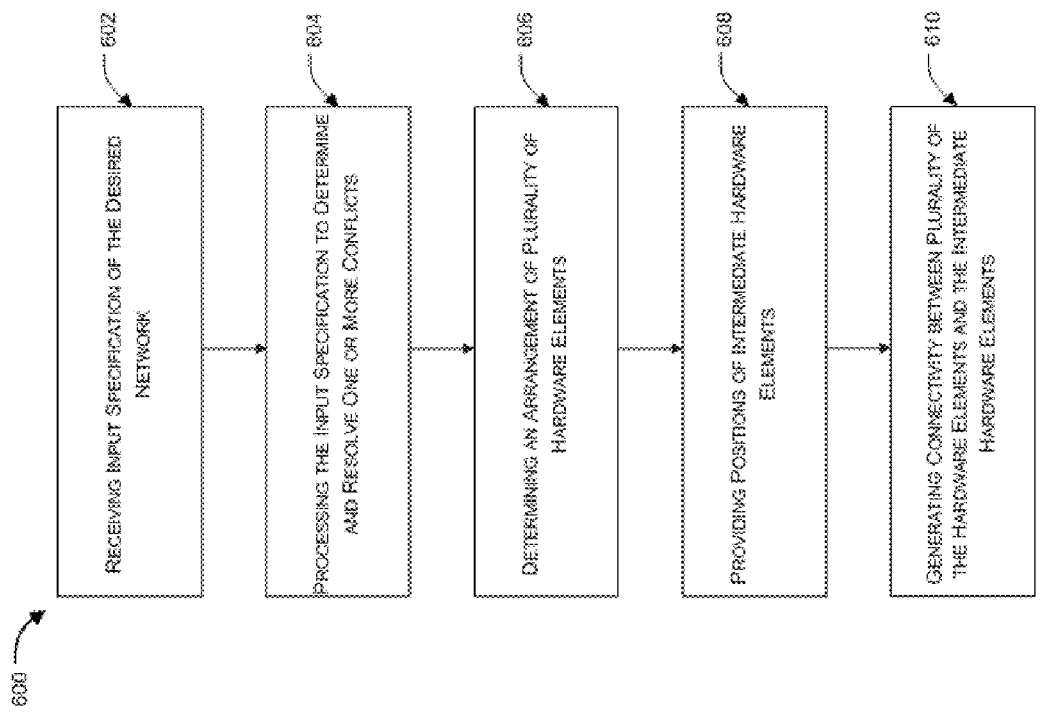
FIG. 6(a) illustrates an example flow diagram for generation of aggregation/distribution network in accordance with an example implementation of the present disclosure.

FIG. 6(a) illustrates an example flow diagram 600 for generation of an aggregation/distribution network in accordance with an example implementation of the present disclosure. The method for automatic generation of aggregation/distribution network can include the steps of receiving an input specification of the desired network, processing the input specification to determine and resolve one or more conflicts, determining an arrangement of a plurality of hardware elements, providing positions of one or more intermediate hardware elements, and generating connectivity between the plurality of hardware elements and the one or more intermediate hardware elements.

At step 602, methods of the present disclosure can receive an input specification of/for the desired network, wherein the input specification can include a user-defined and/or system generated input specification of the desired network indicating an arrangement/construction/layout of hardware elements along with connectivity between such elements. In an example implementation, the input specification can include one or more of traffic profiles of each individual hardware element and/or for the overall network, the power profile of each individual hardware element and/or for the overall network, the number of intermediate hardware elements to be used, the position/location of root hardware element, the routing functions to be used, the range/radius of individual intermediate hardware elements, and so on among other restrictions/limitations/constraints of the network. In an example implementation, one or more inputs can be auto generated based on the other input specifications. For example, if the number of intermediate hardware elements is given as an input, the range/radius of intermediate hardware elements can be generated automatically. Similarly, if the maximum/minimum radius of any intermediate hardware elements is given, the total number of intermediate hardware elements required to generate an aggregation/distribution network can be generated.

In an aspect, at step 604 of the present disclosure, the input specification can be processed to determine and resolve one or more conflicts in say, specified traffic profiles, positions of hardware elements, and overlapping coverage of intermediary hardware elements, among other defined/anticipated conflicts. The step can further be configured to resolve such conflicts using a suitable conflict resolution algorithm.

In an aspect, at step 606, the arrangement of a plurality of hardware elements can be defined such that the location/position of all individual hardware elements can be optimally determined based on the input specification. In an example implementation, the location of one or more hardware elements can be given in the input specification. In another example implementation, location of one or more hardware elements can be auto-generated using aspects of the present disclosure.

In an aspect, at step 608, the positions of one or more intermediate hardware elements can be determined/provided based on any of the user-selected grouping or system-generated grouping of the plurality of hardware elements. In an example implementation, based on the input specification and location of the plurality of hardware elements, one or more groups of hardware elements can be created, and the location of intermediate hardware elements can be fixed accordingly such that an intermediate hardware element covers and is responsible for signals received from or intended for one or more hardware elements that form part of its group. In an example implementation, at least one intermediate hardware element can be placed for each group. In an example implementation, the grouping of hardware elements can be based on the user selection of the plurality to hardware elements that need to be grouped together. In another example implementation, the grouping of hardware elements can be auto-generated based on the input specification, the proximity of hardware elements, the clock frequency of hardware elements, and so on, among other like parameters.

In an aspect, at step 610, the connectivity for the plurality of hardware elements and the one or more intermediate hardware elements can be generated, which can include providing paths between hardware elements of each group and the intermediate hardware element of the group. In an example implementation, hardware elements of a group rely on the intermediate hardware elements (IHE) of that particular group to send and receive signals/commands/data/messages to and from the hardware elements of other groups or to and from other networks. In an example implementation, connectivity between hardware elements can be provided based on user-defined routing functions and/or auto-selected routing function. In another example implementation, one or more intermediate hardware elements (IHE's) can be connected with each other using routing functions to enable sending/receiving of signals such as interrupt/reset signals between IHE's and to/from the root hardware element.

In an example implementation, the generated aggregation/distribution network can be further optimized using a spanning tree structure. In an example implementation, the aggregation/distribution network can be generated for sending/receiving interrupt signals, or for sending/receiving power signals or for sending/receiving reset commands.

Figure 6B:
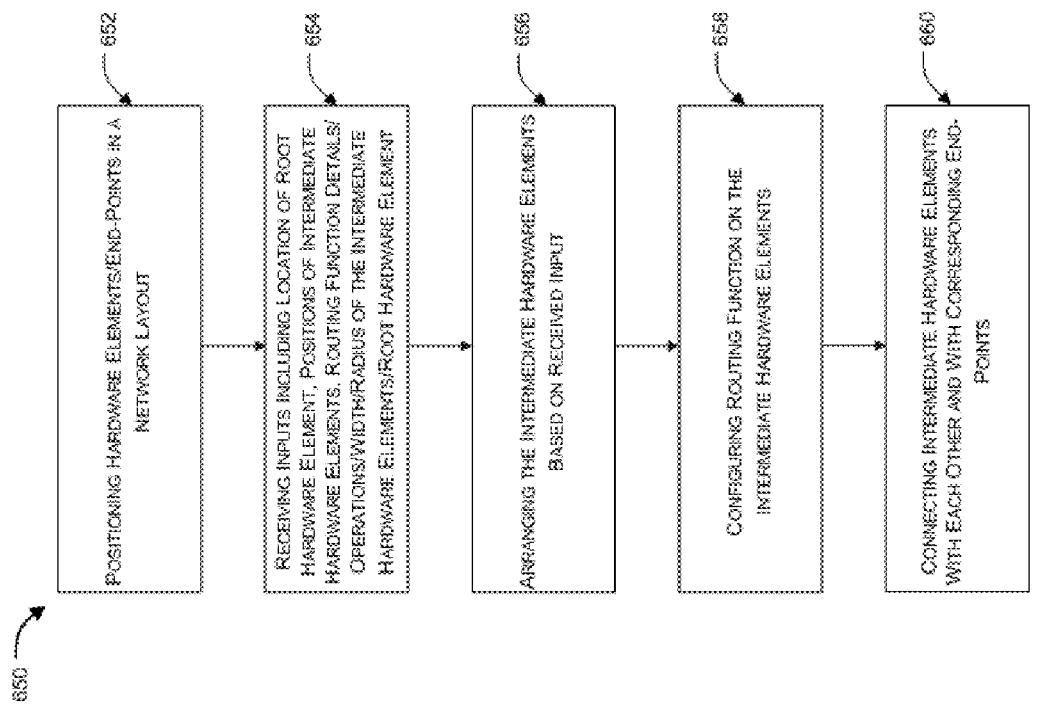
FIG. 6(b) illustrates another example flow diagram for generation of aggregation/distribution network in accordance with an example implementation of the present disclosure.

FIG. 6(*b*) illustrates another example flow diagram 650 for generation of aggregation/distribution network in accordance with an example implementation of the present disclosure. At step 652, positions of hardware elements can be configured or arranged in a network layout, wherein such hardware elements can act as end-points. At step 654, one or more inputs such as the source/destination location of the root hardware element, positions or locations of intermediate hardware elements, routing function details of intermediate hardware elements or the root hardware element, operation of each intermediate hardware element or root hardware element, width of channels connecting intermediate hardware elements/root hardware element, and radius of collection of intermediate hardware elements can be received and processed, among any other desired or configured input. At step 656, the positions/locations/radius of the intermediate hardware elements can be used to define an arrangement of the intermediate hardware elements on the network layout such that one or more intermediate hardware elements can represent a group of one or more hardware elements.

At step 658, the routing function can be used to route intermediate hardware elements to the root node. The routing function can be implemented on a spanning tree structure, wherein one or more intermediate hardware elements can be connected to other intermediate hardware elements in a hierarchical tree architecture to finally connect to a root hardware element that acts as a network level interface and receives interrupts from outside networks and transmits it down to the specified hardware element(s) using the routing function and the connectivity with the intermediate hardware elements.

At step 660, each intermediate hardware element can be implemented within the network with each intermediate hardware element connected to at least one intermediate hardware element and responsible for aggregating/distributing interrupt/power management/reset/other signals between hardware elements or intermediate hardware elements. In an aspect, the intermediate hardware elements can be connected with wires or channels having a width as received from the input specification or automatically determined, wherein such a connection can connect intermediate hardware elements with the root hardware element and also connect hardware elements/end-points that are within the radius of each intermediate hardware element. As a result, the output of the proposed methods can give a set of intermediate hardware elements, their positions, connections between intermediate hardware elements/root hardware element, and connections between intermediate hardware elements and respective end-points.

Figure 7:
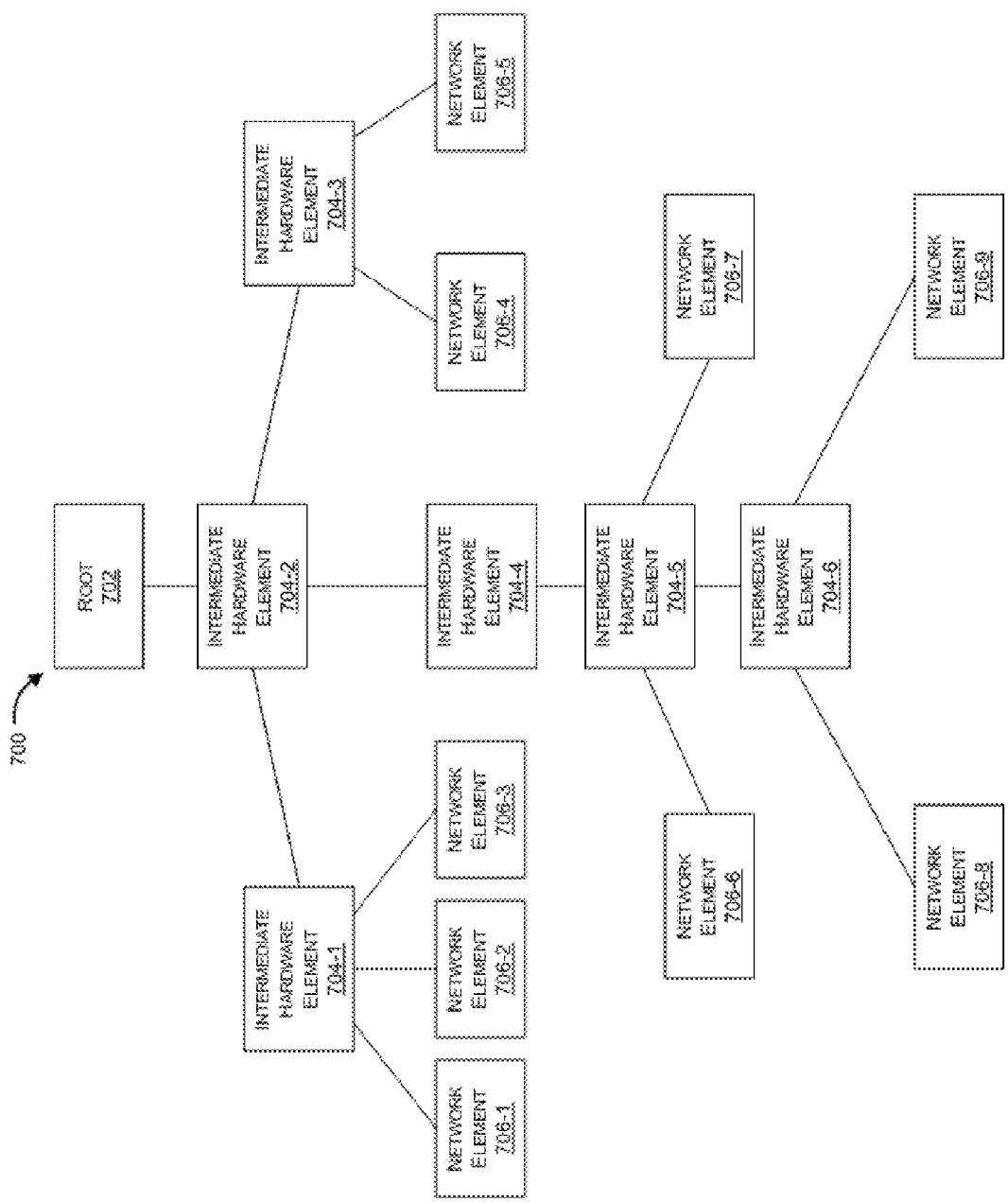
FIG. 7 illustrates an example hierarchical arrangement of intermediate hardware elements created in accordance with an example implementation of the present disclosure.

FIG. 7 illustrates an example hierarchical arrangement of intermediate hardware elements created in accordance with an example implementation of the present disclosure. As shown in FIG. 7, a plurality of intermediate hardware elements can be arranged in a tree structure for creating an efficient aggregation/distribution network. An intermediate hardware element can be configured to aggregate/distribute signals/commands/data from any of one or more intermediate hardware elements and end-point hardware elements. As shown in FIG. 7, intermediate hardware elements such as 704-1, 704-2, . . . , **704-*n*, collectively referred to as intermediate hardware elements 704 or intermediate elements 704 hereinafter, can be configured to aggregate/distribute signals from/to network elements such as 706-1, 706-2, . . . , 706-*m*, collectively referred to as network elements 706 hereinafter. In an instance, hardware elements 706-1, 706-2, and 706-3, can be grouped together and intermediate hardware element 704-1 can be responsible for the interrupt/reset/power management signals that are sent to these hardware elements 706 or received from these hardware/network elements 706. Similarly, intermediate hardware element 704-8 is responsible for network elements 706-8 and 706-9**.

As can be seen, the intermediate hardware elements 704 can be configured in a tree structure such that signals received from, say network elements 706-9 and 706-8 can be aggregated at the intermediate hardware element 704-8 and then sent over to 704-6 to 704-4 to 704-2, and then finally to the root hardware element 702, which acts as an interface of the network. Distribution of signals from the root hardware element 702 can similarly be carried out to the respective/specified network element 706 through the intermediate hardware elements 704.

In an example implementation, hierarchal structure and number of hierarchy levels desired to form the aggregation/distribution network can be defined by a user and/or can be auto-generated by the routing function using one or more input parameters and network specification. In an aspect, the backbone network of the intermediate hardware elements can be created in such a way that a single intermediate hardware element is not over burdened, or an intermediate hardware element is not far from any end-point hardware element. In an example implementation, traffic behavior, traffic load generated from/flowing to all the hardware elements can be analyzed before grouping the plurality of hardware elements and forming the network of intermediary hardware elements.

In an example implementation, intermediate hardware elements are physically aware as they are associated with a group of hardware elements that are in proximity to each other. The physically aware network of IHEs can be used for better simulation or analysis of the network. These intermediaries are consistent in nature as they are designed for a given specification or traffic profile of the network. In an example implementation, number of intermediate hardware elements can be auto-generated based on the given traffic profile, network specification, and/or number of hardware elements on the network.

In an example implementation, for aggregation and segregation/distribution of signals/commands/data, one hot encoding format, or M-hot encoding format, or binary encoding format can used to indicate the source/destination hardware elements. As each intermediate hardware element 704 combines a plurality of signals/commands/data received from plurality of hardware elements, it can use a suitable aggregation function and format to distinguish between signals received from different hardware elements. In an example implementation, connectivity between intermediate hardware elements can be represented and/or optimized using a tree structure format, particularly a spanning tree format.

In an example implementation, intermediary hardware elements can be configured to aggregate/distribute signals/commands/data from/to the hardware, which operates in different frequency domains or in different time domains. In an example implementation, intermediary 704-8 can be configured to aggregate signals from network element 706-8 and network element 706-9, both of which may be operating in different frequencies or at different clock frequencies.

In an example implementation, number of intermediate hardware elements, their position and connectivity can be determined based on one or more user inputs, including but not limiting to, position of each hardware element, indication of location of root hardware element, traffic profile, direction of flow under different conditions, restriction of range/radius of each intermediate hardware element, routing function(s), location restrictions, and other input specification of the network in context. In another example implementation, range/radius of each intermediate hardware element can be determined based on one or more user inputs, including but not limited to, number of intermediate hardware elements to be used, routing functions, location restrictions, and other input specification of network in context.

Figure 8A:
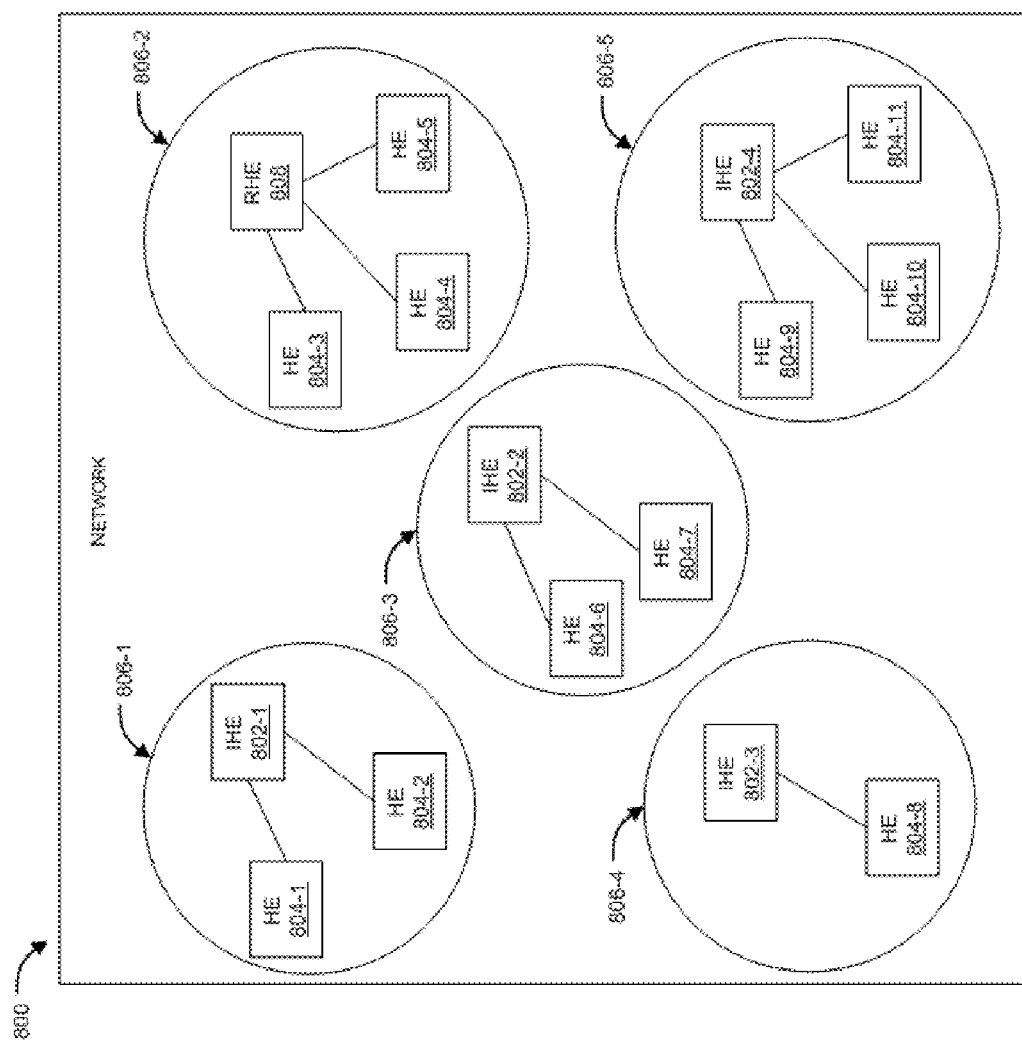
FIGS. 8(a) to 8(c) illustrate an example network of a plurality of cells, each having an intermediate hardware element created in accordance with an example implementation of the present disclosure.
Figure 8B:
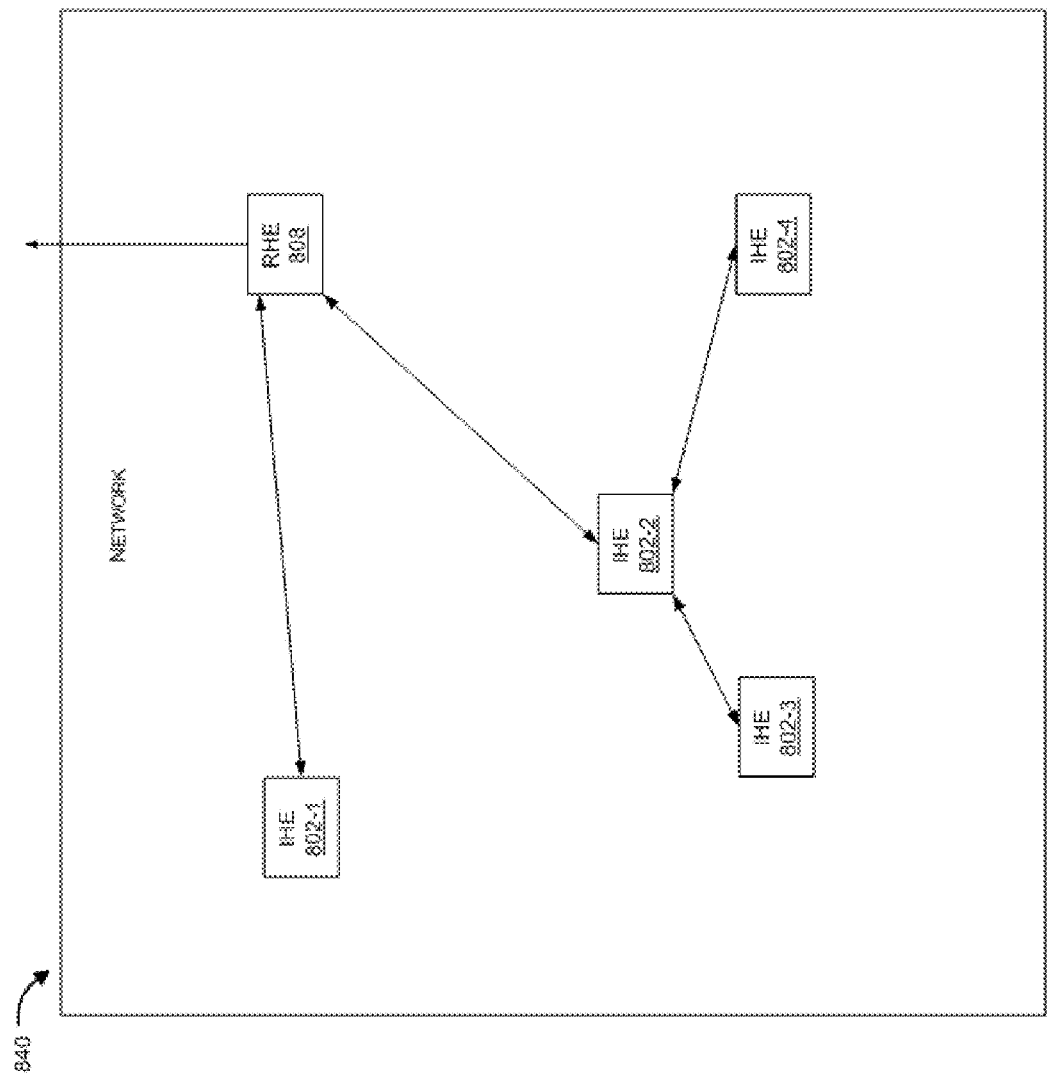
Figure 8C:
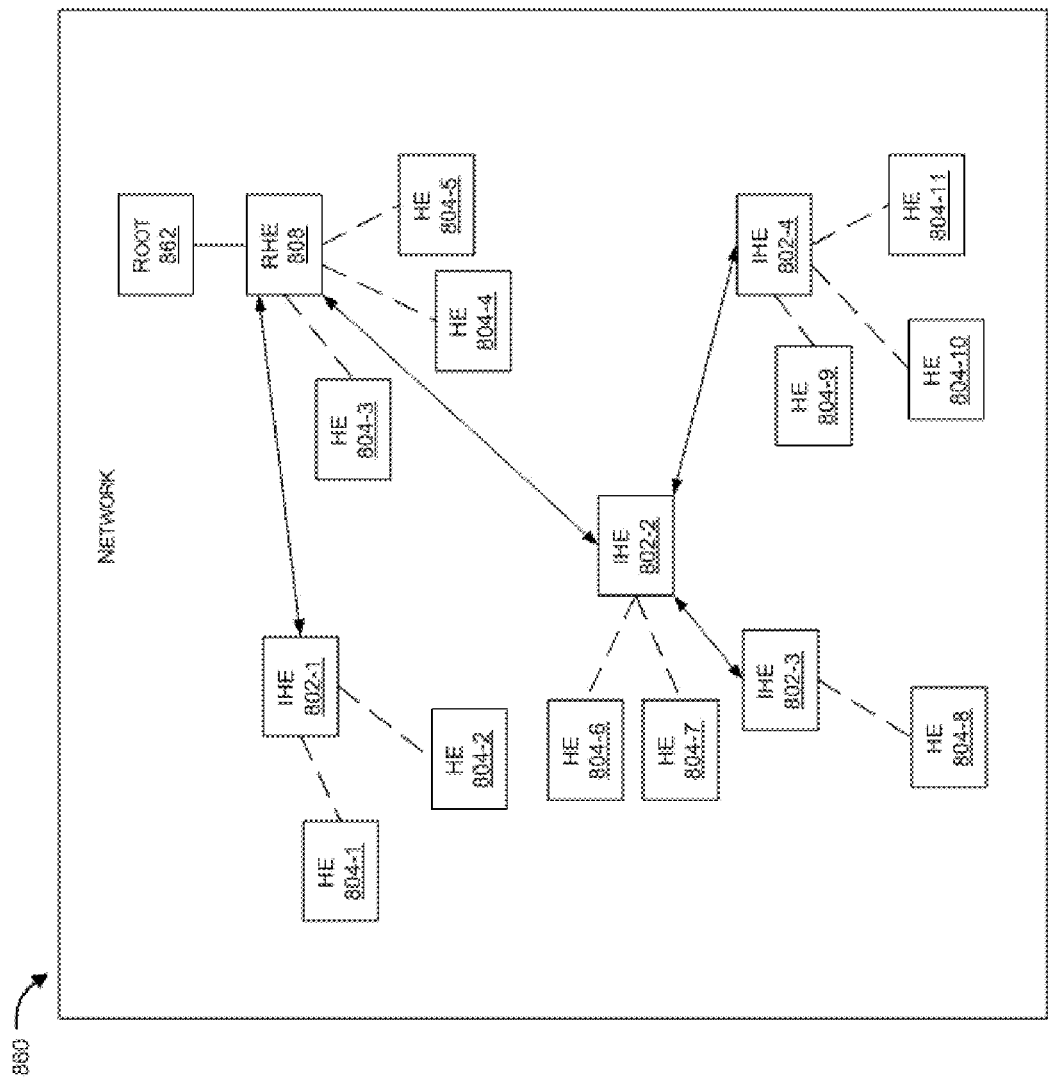

FIG. 8(*a*) illustrates an example network 800 of a plurality of cells, each having an intermediate hardware element 802 created in accordance with an example implementation of the present disclosure. In an example implementation, one or more hardware elements (HEs) 804 (such as 804-1, 804-2, etc.) can be grouped together to form one or more virtual cells 806 (such as 806-1, 806-2, etc) and an intermediate hardware element (IHE) 802 (such as 802-1, 802-2, etc.) can be created for each virtual cell 806. As shown in FIG. 8, a plurality of virtual cells 806 can be created for network 800 and IHEs 802 can be created for each cell 806, wherein each cell 806 can include one or more hardware/network elements 804. For instance, cell 806-1 includes two hardware elements 804-1 and 804-2, and IHE 802-1 can be configured in the cell 806-1 that is responsible for the signals sent from or received at the hardware elements 804-1 and 804-2.

According to one example implementation, the grouping of HEs 804 to form a plurality of virtual cells 806 and creation/placement of a plurality of IHEs 802 can be based on user selection of HEs 804 to be grouped together. In another example implementation, the grouping of HEs 804 to form plurality of cells 806, and creation/placement of plurality of IHEs 802 can be auto-generated based on the network specification and other user inputs. In an example implementation, location/position of IHEs 802 can be determined based on traffic load, clock frequency of operation of HEs, time/frequency domain information of all HEs 804, among other restriction/limitations. In an example implementation, a spanning tree structure can be used to load balance the traffic load at IHEs 802 for determining position of the IHEs 802. Once the HEs 804 are grouped together and placements/locations of IHE's 802 are determined, connectivity between IHEs 802 can be determined by the method of present disclosure.

In an example implementation, the radius or coverage of each group/cell 806 can be determined based on user inputs, including but not limited to, the position of each hardware element 804, indication of location of root hardware element 808, traffic profile, direction of flow under different conditions, restriction of range/radius of each intermediate hardware element 802, routing functions, location restrictions, and other input specification of the network in context. In another implementation, range/radius of each intermediate hardware element 802 can be determined based on one or more user inputs, including but not limited to the number of intermediate hardware elements 802 to be used, routing functions, location restrictions, and other input specifications of the network in context.

In an example implementation, determining the position and number of IHEs 802 based on the given radius can include the steps of tentatively placing intermediate hardware elements 802 for every hardware element, and reversing the intermediate hardware elements 802 that have all the hardware elements present in the radius of another intermediate hardware element 802, or has less number of hardware elements 804 in its radius than a predefined number or the number of hardware elements 804 cannot be reduced further as the intermediate hardware element 802 is required by one hardware element 804 that is not within the radius of any other intermediate hardware element 802. Placement of IHEs 802 can be determined in such a way that the number of IHEs 802 can be reduced as much as possible without reducing the efficiency of the network. Each IHE 802 can be configured to cover as many as hardware elements 804 as possible if it can handle the traffic load.

FIG. 8(*b*) illustrates the connection between intermediate hardware elements 802 and root hardware element 808 based on the routing function that defines the manner in which one or more intermediate hardware elements 802 can route signals to and from the root node 808 in a spanning tree architecture. FIG. 8(*c*) on the other hand, shows connections between the intermediate hardware elements 802, and between the intermediate hardware elements 802 and the root hardware element 808. FIG. 8(*c*) further shows the connections in dotted lines between each intermediate hardware element 802 and its corresponding hardware elements 804 that it represents.

In an example implementation, each IHE 802 can aggregate signals/commands/data from plurality of HEs 804 connected with them, and can forward the aggregated signals/commands/data to other IHEs 802 and/or to the root hardware element 808. In an example implementation, connectivity between pluralities of IHEs 802 can be determined based on network specification or based on user inputs. A backbone structure of IHEs 802 may be created and a root hardware element 808 can be created to aggregate/distribute signal/commands/data from/to any of the IHEs 802. In an example implementation, a user defined or system selected routing function can be used to determine one or more alternative paths/connectivity between different HEs 804 and IHEs 802. In an example implementation, direction of signals/commands/data flow can also be determined by routing functions. In an example implementation, routing function also provide the direction of signal/data flow in the generated network. For instance, routing function can indicate the path that goes to root hardware element 808 through different intermediate hardware elements 802.

In an example implementation, a plurality of HEs 804 working at particular frequency domains or clock domains or time domains can be grouped together and a single IHE 802 can be created for such HEs 804. In an example implementation, plurality of HEs 804 working at different domains such as frequency domains, clock domains, and time domains can be grouped together and a single IHE 802 can be created for aggregating/distributing signal/commands/data to and from these HEs 804 working on different domains.

Figure 9:
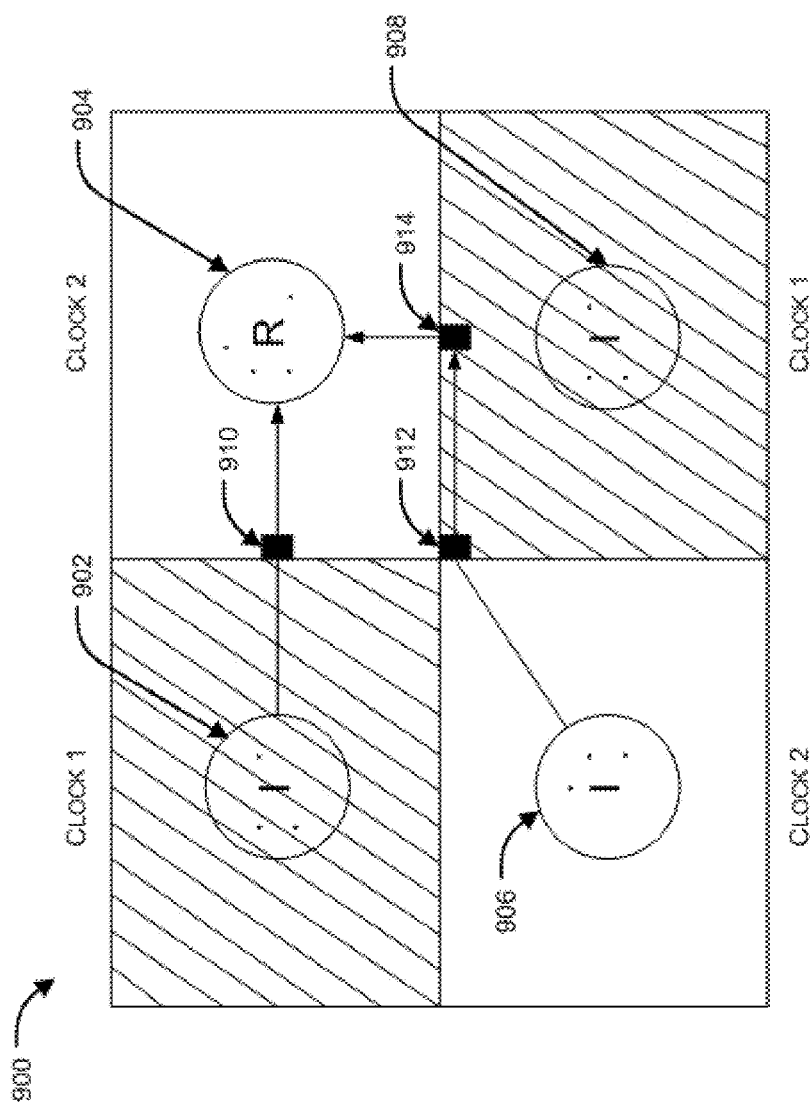
FIG. 9 illustrates an example network having its network elements operating in different clock frequencies in accordance with an example implementation of the present disclosure.

FIG. 9 illustrates an example network having network elements configured to operate in different clock frequencies in accordance with an example implementation of the present disclosure. As shown in FIG. 9, a plurality of network elements placed in proximity of each other and working at clock 1 can be grouped together to form a group 902, and plurality of other network elements placed in proximity of each other and working at clock 2 can be grouped together to form another group 904. A plurality of other network elements that are placed in proximity of each other but spaced apart from the group 902, and working at clock 1, can be grouped together to form another group 906. Similarly, a plurality of other network elements that are placed in proximity of each other but are spaced apart from group 904, and are working at clock 2, can be grouped together to form group 908. FIG. 9 shows "I" as the intermediate network elements that can be provided to aggregate/distribute signals/commands/data from the network elements, which in turn are shown as dots ("."). As can be seen, the group 092 has three dots, which can be interpreted as three network elements that form part of the group/cell and can be represented for their signal communications through the intermediate network element I.

In an example implementation, when a signal needs to be communicated from a network element of group 904 to any of the network element of group 906 that works at different clock frequency, the aggregated signal can be adjusted for clock boundary crossing. In an example implementation, a clock cross adjustment element such as 912 can be placed between the intermediate hardware element "R" of group 904 and intermediate hardware element "I" of group 906 working at different clock frequency. Similar another clock cross adjustment element 910 can be placed between intermediate hardware element of group 902 and intermediate hardware element of group 904 working at different clock frequency, and another clock cross adjustment element 914 can be placed between intermediate hardware element of group 904 and intermediate hardware element of group 908 working at different clock frequency, In an example implementation, placement/location of clock cross adjustment elements can be automatically determined. In an example implementation, feature of the cross adjustment element can be software implemented and hence physical placement of physical clock cross adjustment element may not be required. In an example implementation, clock cross adjustment element can be just a dormant cell that works as a de-metastabilizer and can be configured to automatically compensate the clock difference as and when required.

In an example implementation, intermediate hardware elements can configured to use frequency division multiplying (FDM) or time division multiplexing (TDM) for aggregation/distribution of signals/commands/message/data from/to the plurality of hardware elements. For example, a TDM scheme can be used by the intermediate hardware elements in an aggregation network, where the 1/N of the time slot can be assigned to each hardware element of the group to send the signal/command/data/message to the intermediate hardware elements. Each of the hardware elements can send the signal/command/data/message during its assigned time slot. Similarly, in a distribution network, each hardware element connected to a particular intermediate hardware element can be configured to listen during its 1/Nth time slot. One can appreciate that N is the number of hardware elements that are connected to a single intermediate hardware element.

In an example implementation, different position encoding formats such as one hot encoding, M-hot encoding and binary encoding can be used for indicating the position of the hardware element that is transmitting the signal. For example if there are four intermediate hardware elements, E1, E2, E3, and E4 and a root hardware receives a position indicating code as 0001 using one hot encoding/decoding, the root hardware element can determine that the signal is received from intermediate hardware element E4, Similarly, if it receives a position indicating code as 0010, root hardware element can determine that the signal is received from intermediate hardware element E3. In an example implementation, the network can be configured to use one m-hot position encoding format, where signals from multiple intermediate hardware elements can be grouped together. For example, a network with intermediate hardware elements E1, E2, E3, and E4 sending a location indicating code as 1100 can be interpreted as the signal being received from intermediate hardware elements E1 and E2. In another example implementation, binary encoding can be used for sending a position indicating signal. For example, a network with intermediate hardware elements E1 (0), E2 (1), E3 (2) and E4 (3) sending a code 11 can be interpreted as the signal being sent by E4.

In different example implementations of the present disclosure, the hardware element or intermediate hardware element can be a router or a switch or any other network element of a Network on Chip (NoC). In an example implementation, intermediate hardware elements or root hardware element can be a physical pin or a port that can receive signal/command from another hardware element and can forward to another hardware elements.

In an aspect, method of the present disclosure includes, for an arrangement of a plurality of hardware elements, providing positions and connectivity for one or more intermediate hardware elements that are configured to aggregate signals from the plurality of hardware elements to a root hardware element or to distribute signals to the plurality of hardware elements from the root hardware element. In an aspect, the provision of the positions and the connectivity for the one or more intermediate hardware elements can be based on at least one of minimum distance from a hardware element and associated intermediate element, specified permitted number of intermediate hardware elements, and disallowed regions for the intermediate elements. In another aspect, method of the present disclosure further utilizes a routing function to determine connectivity topology between the intermediate hardware elements.

According to one example implementation, arrangement of the plurality of hardware elements is a Network on Chip (NoC) topology, wherein providing the positions for the one or more intermediate hardware elements can be based on permitted positioning of the NoC elements, and wherein providing connectivity for the one or more intermediate hardware elements is based on permitted positioning of NoC channels. In an aspect, one or more intermediate hardware elements can be configured to aggregate signals from the plurality of hardware elements to the root hardware element by any or a combination of aggregating interrupt signals from the plurality of hardware elements into a single output interrupt signal to the root hardware element through an aggregation function, aggregating reset done signals from the plurality of hardware elements into a single output reset done signal to the root hardware element through the aggregation function, aggregating reset started signals from the plurality of hardware elements into a single output reset started signal to the root hardware element through the aggregation function, and aggregating power management control signals from the plurality of hardware elements into a single output power management control signal to the root hardware element through the aggregation function.

According to another example implementation, the one or more intermediate hardware elements can be configured to distribute signals to the plurality of hardware elements from the root hardware element by identifying a destination of the signals through at least one of a one hot encoding format, an M-Hot encoding format, a binary format, and a tree structure format. According to another example implementation, the plurality of hardware elements and the root hardware element are configured according to a time domain multiplexing schedule to facilitate any or a combination of distribution of the signals to one of the plurality of hardware elements from the root hardware element based on the time domain multiplexing schedule, and source identification to aggregate signals from the plurality of hardware elements to the root hardware element, wherein the root hardware element is configured to conduct source identification based on the time domain multiplexing schedule.

According to another example implementation, one or more intermediate hardware elements can be configured to distribute signals to the plurality of hardware elements from the root hardware element by any or a combination of distributing a reset distribution signal from the root hardware element to the plurality of hardware elements, and distributing a power management control signal from the root hardware element to the plurality of hardware elements. In an aspect, each of the one or more intermediate hardware elements can be configured with a clock based on a clock domain associated with the position of the each of the one or more intermediate hardware elements.

In an aspect, the present disclosure further relates to a non-transitory computer readable medium storing instructions for executing a process, wherein the instructions include, for an arrangement of a plurality of hardware elements, providing positions and connectivity for one or more intermediate hardware elements configured to aggregate signals from the plurality of hardware elements to a root hardware element, or to distribute signals to the plurality of hardware elements from the root hardware element.

Figure 10:
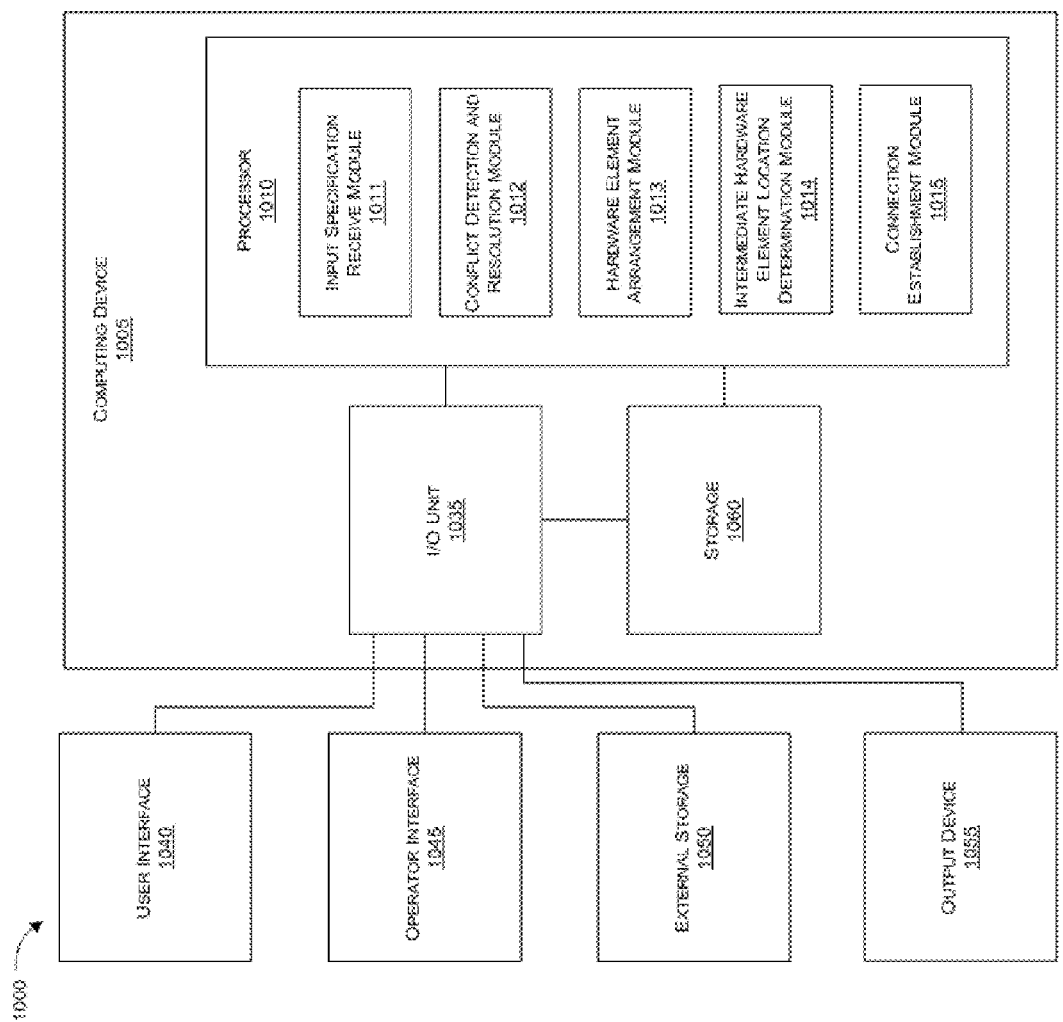
FIG. 10 illustrates an example computer system on which example implementation can be present disclosure can be executed in accordance with an example implementation of the present disclosure.

FIG. 10 illustrates an example computer system on which example implementation can be present disclosure can be executed in accordance with an example implementation of the present disclosure. The computer system 1000 includes a server 1005 which may involve an I/O unit 1035, storage 1060, and a processor 1010 operable to execute one or more units as known to one of skill in the art. The term "computer-readable medium" as used herein refers to any medium that participates in providing instructions to processor 1010 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 1040 and operator interfaces 1045 which may utilize input devices such as a keyboard, mouse, touch device, or verbal command.

The server 1005 may also be connected to an external storage 1050, which can contain removable storage such as a portable hard drive, optical media (CD or DVD), disk media or any other medium from which a computer can read executable code. The server may also be connected an output device 1055, such as a display to output data and other information to a user, as well as request additional information from a user. The connections from the server 1005 to the user interface 1040, the operator interface 1045, the external storage 1050, and the output device 1055 may via wireless protocols, such as the 802.11 standards, Bluetooth® or cellular protocols, or via physical transmission media, such as cables or fiber optics. The output device 1055 may therefore further act as an input device for interacting with a user.

The processor 1010 may execute one or more modules including an input specification receive module 1011, a conflict detection and resolution module 1012, a hardware element arrangement module 1013, an intermediate hardware element location determination module 1014, and a connectivity generation module 1015.

In an example implementation, the input specification receive module 1011 can be configured to receive input specification of the desired network from user. In an example implementation, the input specification receive module 1011 can be configured to receive one or more of traffic profile of each individual hardware element and/or of the overall network, power profile of each individual hardware element and/or of the overall network, number of intermediate hardware elements to be used, position of root hardware elements, routing functions to be used, range/radius of individual intermediate hardware elements, and other restriction/limitation/specification of network. In an example implementation, one or more inputs can be auto-generated based on the other input specifications. For example, if the number of intermediate hardware elements is given as an input, range/radius of the intermediate hardware elements can be generated automatically. Similarly, if the maximum/minimum radius of any intermediate hardware elements is given, the total number of intermediate hardware elements required to generate an aggregation/distribution network can be automatically determined.

In an example implementation, the conflict detection and resolution module 1012 can be configured to determine and resolve one or more conflicts in the input specification to figure out any possible conflict in specified traffic profiles, positions of hardware elements, overlapping coverage of intermediary hardware elements, among others, and then resolve such conflicts using a suitable conflict resolution algorithm.

In an example implementation, the hardware element arrangement module 1013 can be configured to optimally determine the location/position of all individual hardware elements based on the input specification. In an example implementation, location of one or more hardware elements can be given as an input specification. In another example implementation, location of one or more hardware elements can be auto-generated using method of the present disclosure.

In an example implementation, intermediate hardware element location determination module 1014 can be configured to provide position of one or more intermediate hardware elements based on user selected grouping, or system generated grouping of the plurality of hardware elements or any other parameter or combination thereof. In an example implementation, based on the input specification and location of the plurality of hardware elements, one or groups can be created and location of intermediate hardware elements can be fixed accordingly. In example implementation, intermediate hardware elements can be placed for each group. In an example implementation, grouping of hardware elements can be based on user selection or can be auto-generated based on input specification, proximity of hardware elements, clock frequency of hardware elements, among other like parameters/factors/attributes.

In an example implementation, connectivity generation module 1015 can be configured to generate connectivity for a plurality of hardware elements and one or more intermediate hardware element. In an example implementation, all hardware elements of a group rely on the intermediate hardware element of that particular group to send/receive signals/commands/data/messages to/from the hardware elements of other group or to/from other networks. In an example implementation, connectivity between hardware elements can be provided based on user defined routing functions and/or auto-selected routing function.

In an example implementation, the generated aggregation/distribution network can be further optimized using a spanning tree structure. In an example implementation, the aggregation/distribution network can be generated for sending/receiving interrupt signals or for sending/receiving power signals or for sending/receiving reset commands.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method, comprising:
  generating an arrangement of a plurality of hardware elements and a root hardware element from processing an input specification; and
  providing, using a computer, positions and connectivity for one or more intermediate hardware elements configured to:
    aggregate signals from the plurality of hardware elements to the root hardware element; or
    distribute signals to the plurality of hardware elements from the root hardware element, and
  providing paths between the one or more intermediate hardware elements, the plurality of hardware elements and the root hardware element based on the positions and connectivity.

2. The method of claim 1, wherein the providing the positions and the connectivity for the one or more intermediate hardware elements is based on at least one of:

minimum distance from a hardware element and associated intermediate element;
specified permitted number of intermediate hardware elements; and
disallowed regions for the intermediate elements.

3. The method of claim 1, further comprising utilizing a routing function to determine connectivity topology between the intermediate hardware elements.

4. The method of claim 1, wherein the providing the positions for the one or more intermediate hardware elements is based on permitted positioning of Network on Chip (NoC) elements, and wherein the providing the connectivity for the one or more intermediate hardware elements is based on permitted positioning of NoC channels.

5. The method of claim 1, wherein the one or more intermediate hardware elements are configured to aggregate signals from the plurality of hardware elements to the root hardware element by at least one of:
aggregating interrupt signals from the plurality of hardware elements into a single output interrupt signal to the root hardware element through an aggregation function;
aggregating reset done signals from the plurality of hardware elements into a single output reset done signal to the root hardware element through the aggregation function;
aggregating reset started signals from the plurality of hardware elements into a single output reset started signal to the root hardware element through the aggregation function;
aggregating power management control signals from the plurality of hardware elements into a single output power management control signal to the root hardware element through the aggregation function.

6. The method of claim 1, wherein the one or more intermediate hardware elements are configured to distribute signals to the plurality of hardware elements from the root hardware element by identifying a destination of the signals through at least one of a one hot encoding format, an M-Hot encoding format, a binary format, and a tree structure format.

7. The method of claim 1, wherein the plurality of hardware elements and the root hardware element are configured according to a time domain multiplexing schedule to facilitate:
distribution of the signals to one of the plurality of hardware elements from the root hardware element based on the time domain multiplexing schedule; and
source identification to aggregate signals from the plurality of hardware elements to the root hardware element, wherein the root hardware element is configured to conduct source identification based on the time domain multiplexing schedule.

8. The method of claim 1, wherein the one or more intermediate hardware elements are configured to distribute signals to the plurality of hardware elements from the root hardware element by at least one of:
distributing a reset distribution signal from the root hardware element to the plurality of hardware elements;
distributing a power management control signal from the root hardware element to the plurality of hardware elements.

9. The method of claim 1, wherein each of the one or more intermediate hardware elements are configured with a clock based on a clock domain associated with the position of the each of the one or more intermediate hardware elements.

10. A non-transitory computer readable medium storing instructions for executing a process, the instructions comprising:
generating an arrangement of a plurality of hardware elements and a root hardware element from processing an input specification; and
providing positions and connectivity for one or more intermediate hardware elements configured to:
aggregate signals from the plurality of hardware elements to the root hardware element; or
distribute signals to the plurality of hardware elements from the root hardware element; and
providing paths between the one or more intermediate hardware elements, the plurality of hardware elements and the root hardware element based on the positions and connectivity.

11. The non-transitory computer readable medium of claim 10, wherein the providing the positions and the connectivity for the one or more intermediate hardware elements is based on at least one of:
minimum distance from a hardware element and associated intermediate element;
specified permitted number of intermediate hardware elements; and
disallowed regions for the intermediate elements.

12. The non-transitory computer readable medium of claim 10, wherein the instructions further comprise utilizing a routing function to determine connectivity topology between the intermediate hardware elements.

13. The non-transitory computer readable medium of claim 10, wherein the providing the positions for the one or more intermediate hardware elements is based on permitted positioning of Network on Chip (NoC) elements, and wherein the providing the connectivity for the one or more intermediate hardware elements is based on permitted positioning of NoC channels.

14. The non-transitory computer readable medium of claim 10, wherein the one or more intermediate hardware elements are configured to aggregate signals from the plurality of hardware elements to the root hardware element by at least one of:
aggregating interrupt signals from the plurality of hardware elements into a single output interrupt signal to the root hardware element through an aggregation function;
aggregating reset done signals from the plurality of hardware elements into a single output reset done signal to the root hardware element through the aggregation function;
aggregating reset started signals from the plurality of hardware elements into a single output reset started signal to the root hardware element through the aggregation function;
aggregating power management control signals from the plurality of hardware elements into a single output power management control signal to the root hardware element through the aggregation function.

15. The non-transitory computer readable medium of claim 10, wherein the one or more intermediate hardware elements are configured to distribute signals to the plurality of hardware elements from the root hardware element by identifying a destination of the signals through at least one of a one hot encoding format, an M-Hot encoding format, a binary format, and a tree structure format.

16. The non-transitory computer readable medium of claim 10, wherein the plurality of hardware elements and the root hardware element are configured according to a time domain multiplexing schedule to facilitate:
- distribution of the signals to one of the plurality of hardware elements from the root hardware element based on the time domain multiplexing schedule; and
- source identification to aggregate signals from the plurality of hardware elements to the root hardware element, wherein the root hardware element is configured to conduct source identification based on the time domain multiplexing schedule.

17. The non-transitory computer readable medium of claim 10, wherein the one or more intermediate hardware elements are configured to distribute signals to the plurality of hardware elements from the root hardware element by at least one of:
- distributing a reset distribution signal from the root hardware element to the plurality of hardware elements;
- distributing a power management control signal from the root hardware element to the plurality of hardware elements.

18. The non-transitory computer readable medium of claim 10, wherein each of the one or more intermediate hardware elements are configured with a clock based on a clock domain associated with the position of the each of the one or more intermediate hardware elements.

* * * * *